United States Patent
Jonsson

(10) Patent No.: US 8,380,005 B1
(45) Date of Patent: Feb. 19, 2013

(54) SYSTEM AND METHOD FOR IMAGE COMPOSITION USING NON-DESTRUCTIVE EDITING MODEL AND FAST GRADIENT SOLVER

(75) Inventor: Michael D. Jonsson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1054 days.

(21) Appl. No.: 12/364,378

(22) Filed: Feb. 2, 2009

(51) Int. Cl.
*G06K 9/36* (2006.01)
(52) U.S. Cl. .................. 382/282; 382/284; 382/299
(58) Field of Classification Search .................. 382/282, 382/283, 284, 299
See application file for complete search history.

(56) References Cited

U.S. PATENT DOCUMENTS

| | | | | |
|---|---|---|---|---|
| 5,577,179 A | * | 11/1996 | Blank ........................... | 345/639 |
| 5,579,471 A | * | 11/1996 | Barber et al. ................ | 715/700 |
| 7,024,054 B2 | * | 4/2006 | Cahill et al. .................. | 382/294 |
| 2005/0190189 A1 | | 9/2005 | Chefd'hotel et al. | |
| 2005/0254722 A1 | | 11/2005 | Fattal et al. | |
| 2007/0013813 A1 | | 1/2007 | Sun et al. | |
| 2007/0165966 A1 | | 7/2007 | Weiss et al. | |
| 2008/0143744 A1 | | 6/2008 | Agarwala | |
| 2008/0175508 A1 | | 7/2008 | Bando et al. | |
| 2008/0198175 A1 | * | 8/2008 | Sun et al. ...................... | 345/629 |
| 2008/0301546 A1 | * | 12/2008 | Moore et al. .................. | 715/243 |
| 2010/0086227 A1 | | 4/2010 | Sun et al. | |

OTHER PUBLICATIONS

Michael Kazhdan and Hugues Hoppe. 2008. Streaming multigrid for gradient-domain operations on large images. In ACM SIGGRAPH 2008 papers (SIGGRAPH '08). ACM, New York, NY, USA, Article 21, 10 pages.
James McCann and Nancy S. Pollard. 2008. Real-time gradient-domain painting. In ACM Siggraph 2008 papers (SIGGRAPH '08). ACM, New York, NY, USA, Article 93, 7 pages.

* cited by examiner

*Primary Examiner* — Jon Chang
(74) *Attorney, Agent, or Firm* — Wolfe-SBMC

(57) ABSTRACT

Systems and methods for interactive image compositing may integrate image searching using visual search criteria (e.g., color, composition, tonal distribution, or lighting effects), non-destructive image compositing, and high-performance rendering using a fast gradient solver to provide an efficient workflow for users. An image compositing application, executable by a CPU and/or GPU, may employ a sketch-and-refine approach, whereby a user draws a rough perimeter around an object of interest in an image and (following an initial application of the fast gradient solver to a lower-resolution version of the image) receives a preview of how it would fit into a composition. The fast gradient solver may differentiate between the object and its background by applying artificial intelligence techniques and/or dependent on user-supplied hints. In a second stage, the fast gradient solver may refine the solution for a final rendering of the composite image by operating on successively higher-resolution versions of the image.

40 Claims, 20 Drawing Sheets

SYSTEM AND METHOD FOR IMAGE COMPOSITION USING NON-DESTRUCTIVE EDITING MODEL AND FAST GRADIENT SOLVER

BACKGROUND

Description of the Related Art

Graphic applications include an ever-increasing number of image editing features, such as various filtering options, image feature relocation operations, resizing operations (e.g., for cropping, expanding, or reducing an image). With the recent explosion in the number of digital images available to graphic artists and others involved in image creation and/or publication (e.g., due to the increasing use of digital photography and both public and private websites through which users can share images with others), these users may also want to compose new images by combining images, or by adding particular elements of one image to another image. Typically, an art director must first identify candidate images from various sources, and then pass information about the candidate images to an art buyer, who will do the purchase. After the purchase, the art buyer passes the images back to the art director, who creates a composite image and passes it on to a production department for final production (i.e. preparing it for printing or publication on the Web).

In addition to these difficulties in acquiring images, combining the images involves additional challenges. For example, image compositing operations, such as extracting image elements from one or more source images and inserting them into a target image, or removing elements from a target image and replacing them by other elements, typically involve one or more elaborate and time consuming computational tasks.

Some previous techniques on image matting and image composition work at a pixel-level accuracy, and have been shown to perform well in extracting foreground layers in images and placing them on a new background. However, these techniques are computationally complex and consume large amounts of both time and resources. In addition, they typically require the user to provide very accurate inputs to drive construction of a new output image.

SUMMARY

Systems and methods for performing interactive image compositing may allow users to insert and/or modify images, or portions thereof, to compose new images in real time. As described herein, an image compositing application may in some embodiments provide a framework for the integration of interactive image searching capability using visual search criteria, non-destructive image compositing, and a high-performance rendering model employing a fast gradient solver. Such an application may streamline image discovery, image acquisition, and compositing operations into an efficient workflow for users.

Through an image search module of the image compositing application, a user may perform image searches using visual search criteria, e.g., a color, a pattern, a color distribution, an image composition, a distribution of image elements, a tonal distribution, or a lighting effect. For example, the user may search the Web and/or his local drive for images, preview candidate photos with color patterns or content similar to that of a reference image, and add selected ones of those images to his collection from multiple sources, in various embodiments. Using an interactive editing model, the user may select images from his collection on which to perform advanced editing such as scene completion, which may involve inserting new objects while maintaining them as separately editable elements of a composite image, making adjustments to inserted objects, and adding reflections or shadows to complete the composite image. The editing model may be non-destructive, making modifications to a working copy of an image or an object thereof for inclusion in a composite image, without modifying other images or objects included in the composite image, or data representing the images in persistent storage.

The image composition application described herein may use a sketch-and-refine approach to image composition. For example, in an initial step, after an image has been identified, a user may draw a rough perimeter around an object of interest in the image (i.e. an image element) and may receive instantaneous feedback about how the object, once extracted from the image, would fit into the composition. In various embodiments, the object may be merged into a destination image to generate a composite image by blending the object and the destination image in the gradient domain using the fast gradient solver of the application. In order to blend the object and the destination image, the object of interest must be distinguished from its background contents so that it can be extracted from its background. While this is easy for the human eye to distinguish, it may be much harder to do computationally.

In some embodiments, in order to differentiate between the object of interest and its background contents, the fast gradient solver may obtain an initial unaided result by drawing inferences from color and/or tonal information found along the rough perimeter. In other words, the fast gradient solver may apply artificial intelligence in distinguishing the object of interest from its background. In some embodiments, the user may improve the solution by augmenting (e.g., annotating) the image with "jots" to define exclusion and/or inclusion zones, as described herein.

In order to obtain interactive performance, the fast gradient solver may employ a two-stage rendering model. In the first stage, an initial screen-size resolution image may be generated (e.g. for an immediate preview). The resolution of this initial image may be lower than that of the image from which the object of interest was extracted. In the second stage, a final rendering may be performed that further refines the composite image. This may involve applying the fast gradient solver to higher-resolution version of the image than one used to generate the immediate preview. For example, in one embodiment, the application may be configured to generate an image pyramid of two or more levels, in which each level of the image pyramid comprises data representing a respective version of the image having a different image resolution. In such embodiments, the fast gradient solver may operate on data of the lowest-resolution level of the image pyramid to generate the preview image, and may operate on data of successively higher resolution levels of the image pyramid during the second stage. In some embodiments, the second stage may be performed during idle time of the application (i.e. while no user interaction is taking place), and the screen-sized preview may be gradually refined to a level suitable for the final rendering.

In some embodiments, the application may provide editing tools for modifying one or more objects inserted in a composite image, including modifying the color, contrast, exposure, brightness, sharpness, color balance, size, aspect ratio, orientation, position, or other parameters of an object, or may duplicate or generate a mirror image of an object in the composite image. In such embodiments, the image compositing application may re-apply the two-stage rendering model to quickly merge the modified object into the composite image as each modification is made. In such embodiments, the image compositing application may be configured to generate and display a new preview of the composite image in which the modified object appears to be inserted in the destination image, rather than the unmodified object. In other embodiments, the application may allow the user to export a composite image to another graphics application to apply finishing touches or otherwise continue to process the composite image.

The methods described herein may be implemented as program instructions, (e.g., stored on computer-readable storage media) executable by a CPU and/or GPU, in various embodiments. For example, they may be implemented as program instructions that, when executed, implement an image editing application in response to user input. This image editing application may perform image editing operations using inverse patch transforms, thus generating reconstructed output images, and may perform correction of visual artifacts in the output image using patch jittering, as described herein. The selection of particular image editing operations or correction operations to be applied to an image (and/or parameters thereof) may be specified by the user (e.g., through a graphical user interface).

Figure 1:
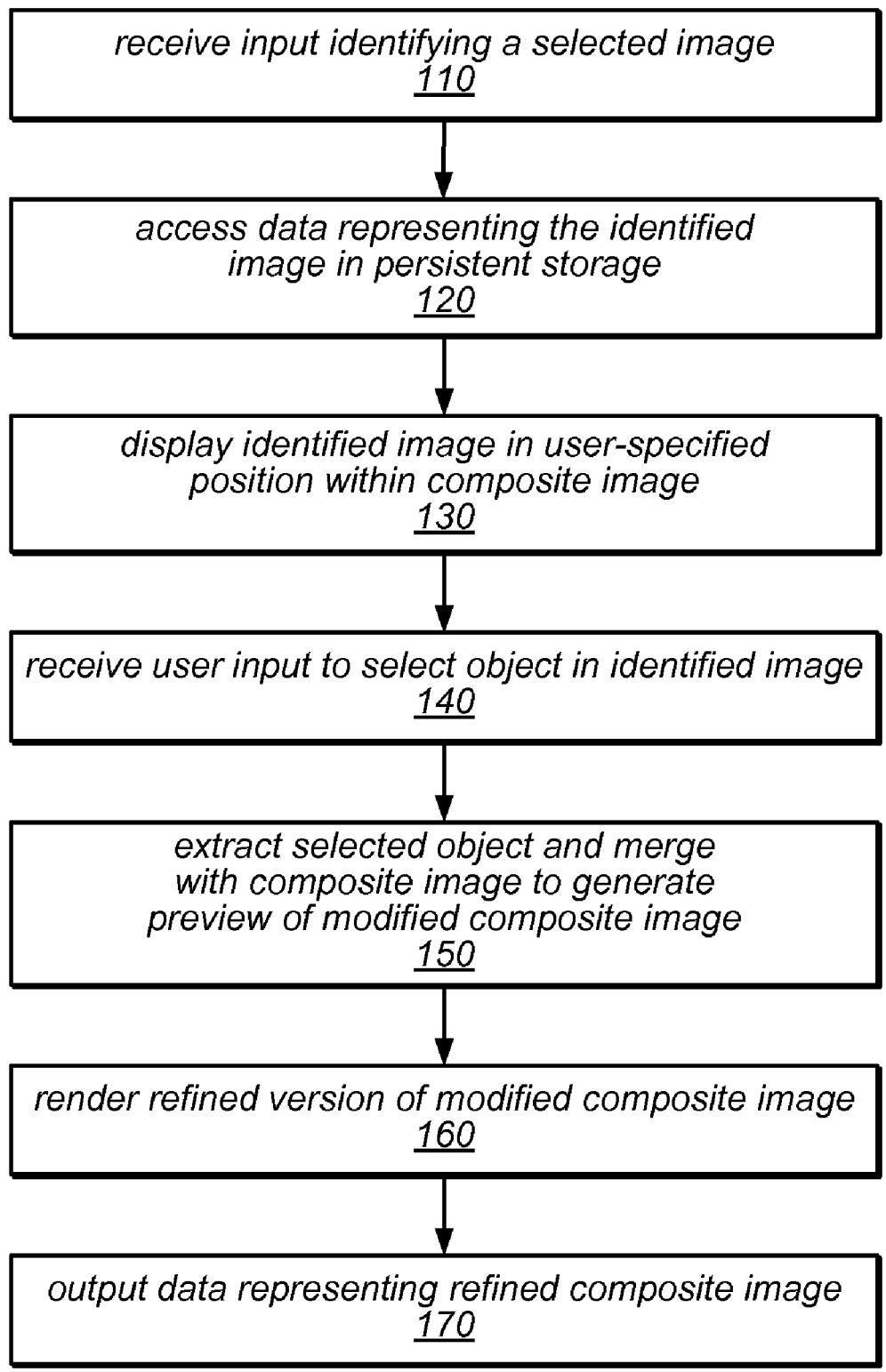
FIG. 1 illustrates a method for image compositing in a graphics application, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, graphic applications include an ever-increasing number of image editing features, and users have access to an ever-increasing number of images from which to choose when composing new images. In some embodiments, an image compositing application may provide a framework that integrates an easy interactive user interface for discovery and selection of images, and a high performance, low-complexity computational model that employs a fast gradient solver and a non-destructive editing model (i.e. sketch-and-refine selection model) made possible by the real-time solver. Such an application may transform the way people interact with their own photographs by allowing them to leverage the information available to them in the billions of images over the Internet.

In some embodiments, an image compositing application, such as that described herein, may provide a user experience that turns static images into dynamic, shared content. The application may combine advanced navigation, editing and viewing techniques with collaboration to bring image collections to life for creative graphics professionals. Through an image search module of the application, the user may search the Web and/or his local drive for images, preview candidate photos with similar color patterns or content to a reference image, and add images to his collection from multiple sources, in various embodiments. Using an interactive editing model, the user may select images from his collection on which to perform advanced editing such as scene completion, which may involve composite images moving, rotating and mirroring existing objects, inserting new objects as separately editable elements of a composite image, making adjustments to inserted objects, and adding reflections or shadows to complete the composite image. In some embodiments, the application may allow the user to export a composite image to another graphics application to apply finishing touches or otherwise continue to process the composite image.

As previously noted, in order to reduce the complexities of image compositing tasks (e.g., extracting elements from source images and inserting them into a target image, or removing elements from a target image and replacing them with other elements), an interactive editing model may employ a sketch-and-refine approach to the composition of images from multiple sources. In other words, the model may not require the user to precisely identify image elements in order for them to be extracted from one image and inserted into another. Instead, a rough estimate of the boundaries of an object of interest may be used to obtain an adequate initial visual result, and the model may use artificial intelligence methods to automatically refine the selection. The model may employ non-destructive editing and rendering in which all edits may be translated into parameters and attributes that describe the composition and that are kept persistent and independent from the rendered composition itself. This model may thus enable re-rendering reflecting changes made to parameters and attributes. In such embodiments, no image data making up the individual objects comprising a composite image are changed in a persistent fashion. Therefore, renderings may be repurposed using the original image elements, using a different set of parameters.

FIG. 1 illustrates one such method for creating a composite image, according to one embodiment. In this example, an image compositing application (e.g., a stand-alone application or a module of another graphics application configured to perform the operations described herein) may be configured to receive user input identifying a selected image to be added to a composite image, as in 110. For example, in various embodiments, such an application may be configured to receive user input identifying a given image in a collection of images available to the user through a graphical user interface, as described in more detail below. The application may be configured to access data representing the identified image from persistent storage, such as an individual disk, disk arrays, optical device (e.g., CD-ROMs, CD-RW drives, DVD-ROMs, DVD-RW drives), flash memory device, etc., as in 120.

As illustrated in FIG. 1, the application may be configured to display the identified image superimposed on top of another image as part of a work in progress (i.e., as an overlay of a composite image under construction) in a position specified by the user, as in 130. For example, in some embodiments, after identifying an image to be added to the composite image, or as part of the selection of the identified image, the user may "drag and drop" the identified image into a frame of the user interface serving as a work area for the composition of the composite image.

In some embodiments, the application may be configured to allow the user to select an image element (i.e. an object depicted in the identified image) that is to be included in the composite image, rather than the entire image, as in 140. For example, in one embodiment, the user may select an image element by drawing a coarse perimeter around the image element of interest, e.g., using a freehand drawing tool or polygon drawing tool of the graphical user interface. In some embodiments, the user may further improve the selection of the object of interest by augmenting the selection with "jots" (i.e. image annotations) to define exclusion/inclusion zones. In other words, in addition to allowing the user to roughly sketch the perimeter of the object using a drawing tool, the user interface may also be configured to provide a tool to allow the user to provide hints to aid in extracting the object by marking a portion of the identified image as being part of the object of interest or as being part of the background of the image.

In response to user selection of an object, the application may be configured to extract the selected object from the identified image, and may provide instantaneous feedback of how the extracted image element fits into the composition, as in 150. As previously noted, in order to obtain interactive performance, the image composition application may in some embodiments employ a two-stage rendering model that includes one stage for rendering an initial result with screen-size resolution and one for final rendering. In the example illustrated in FIG. 1, the application may be configured to merge the extracted object with the composite image to generate a preview of the composite image, as modified by the addition of the selected object. In some embodiments, extracting and merging the selected object into the destination image may be performed by blending in the gradient domain using a fast gradient solver, as described in more detail below. In order to differentiate between the selected image element and the background of the identified image, an initial unaided result may be obtained by drawing inferences from color and tonal information found along the perimeter of the selection.

In the second rendering stage, shown as 160, the application may be configured to render a refined version of the modified composite image. For example, in some embodiments, the screen-sized preview may be gradually refined to a level that equals the final rendering during idle-time (i.e. while no user interaction is taking place). As illustrated in FIG. 1, once the refined composite image has been rendered, the image compositing application may be configured to output data representing the composite image, as in 170. For example, in addition to the data being used to display the composite image to the user, the data may be stored by the application in memory local to the image compositing application for further processing and/or may be written to persistent storage for subsequent access by the image compositing application or another application, in various embodiments.

In some embodiments, the user may be able to enhance the tonal and color as well as geometric appearance of the inserted image element before it is inserted in the composite image, while it is still in the "preview" phase (i.e. following the initial rendering, but before final rendering), and/or following the final rendering phase. While the composite image is being constructed and/or modified, the image compositing application may be configured to maintaining each of the selected images and/or image elements of the composition, including the destination image, as separately editable elements of the composite image. In other words, the application may provide graphics editing tools for iteratively modifying a working copy of the data representation of the object without modifying the data of the underlying image of the composition and without modifying the data representing the identified image from which the object was extracted. In such embodiments, any of a variety of operations may be performed on the object in response to user input, such as modifying the color, contrast, exposure, brightness, sharpness, color balance, size, aspect ratio, orientation, position, or other parameters of the image element, or may duplicate or generate a mirror image of the image element in the composite image, and the image compositing application may re-apply the two-stage rendering model to merge the modified object into the composite image as each modification is made.

Although not shown in FIG. 1, it should be understood that the image compositing application may be configured to support the addition of multiple image elements from one or more identified source images, by performing the operations illustrated in FIG. 1 for each additional image and/or image element thereof. In some embodiments, the image compositing application may include an integrated image search module, through which the application may identify candidate images and image elements for inclusion in a composite image. Such an image search module may allow a user to search his own collection of images (e.g., an image database on his local disk drive) or to search for images from external images sources (e.g., an image collection or database in remote persistent storage to which he has access, commercial image databases, individual shared images or collections of shared images on public websites, etc.) The image search module may allow the user to search for images using visual search criteria instead of, or in addition, to file type, file name, and/or keyword criteria. For example, in some embodiments, the application may allow the user to search for images including similar colors, color patterns, tonal patterns or distributions, lighting effects, content, and/or content distribution as an image identified by the user as a reference image for a given search. The user may then select one or more images from the search results to include in the collection of images available to him during construction and/or modification of a composite image by the image compositing application. The user may then perform advanced editing on these images, or on selected image elements thereof, as part of the construction or modification of the composite image.

Figure 2:
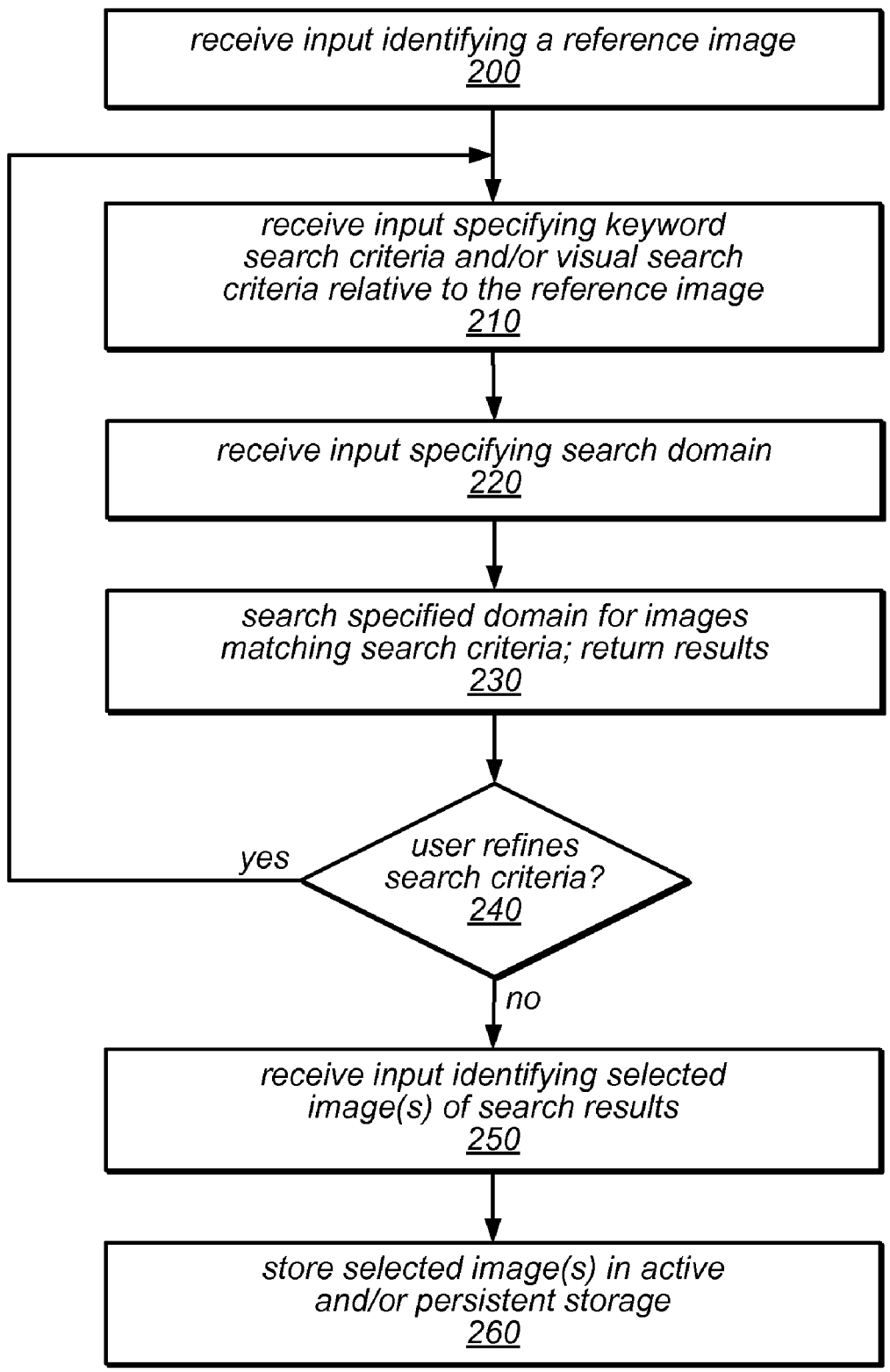
FIG. 2 illustrates a method for performing an image search, according to one embodiment.

One method for performing an image search using visual search criteria is illustrated in FIG. 2. In this example, an image search module (e.g., an image search module of an image compositing application) may be configured to receive input identifying a reference image, as in 200. For example, the user may use a selection tool (e.g., a cursor controlled by a mouse, track ball, touch pad, or similar) to identify a reference image from among active images in a frame of the user interface of the image compositing application. The image search module may be configured to receive input specifying visual search criteria and/or keyword search criteria relative to the reference image, as in 210. For example, the search module may be configured to prompt the user to enter a keyword to be used in the image search or to select an image element to be used as a reference in the image search. The search module may be configured to prompt the user to specify one or more types of visual search criteria to use in the image search (e.g., whether to attempt to match the color, color distribution, content, and/or content distribution of the reference image or of the selected image element thereof).

In the example illustrated in FIG. 2, the image search module may be configured to receive input specifying a search domain for the image search, as in 220. For example, in various embodiments, the search module may be configured to prompt the user to choose to whether direct the image search to his own image collection, to any or all public websites, and/or to a collection of images available from a commercial image source. The search module may be configured to perform the image search in the specified search domain and to return any results, e.g., one or image matching the search criteria, as in 230. For example, various data formats in which images are stored include metadata portions that may be annotated with keyword information, and the image search module may be configured to search for that information in the metadata. In another example, some commercial and public image databases are beginning to automatically glean visual information from images when they are obtained (e.g., information about the colors, contrast, color distribution, or color balance exhibited in the images), and to store that information in descriptors associated with the images. In some embodiments, the image search module may be configured to search for that information when accessing those image databases.

In some embodiments, such as that illustrated in FIG. 2, the image search module may be configured to allow the user to refine the search criteria in response to receiving the initial search results, as in 240. In such embodiments, if the user chooses to refine the search criteria, the operations illustrated in 210-230 of FIG. 2 may be repeated until the user is satisfied with one or more candidate images returned by the image search module. The search module may be configured to allow the user to identify the one or more candidate images from among the search results, as in 250, and to store the candidate images in memory local to the image search module and/or the image compositing application, and/or to store the candidate images in persistent storage for later access through the image search module, the image compositing application, or another application, as in 260.

The image search module of the image compositing application may be further described by way of example. FIGS. 3A-3E illustrate the selection of candidate images for use in constructing and/or modifying a composite image using one such search module, according to one embodiment. In this example, a user interface window 300 of an image compositing application displays various frames that may be visible to a user during an image search operation. In FIGS. 3A-3E, active images (i.e. those currently available for selection and merging into a composite image) are displayed in a frame on the left side of window 300, various menu items are displayed in a frame along the top of window 300, and search results are displayed in a large central frame in window 300.

Figure 3A:
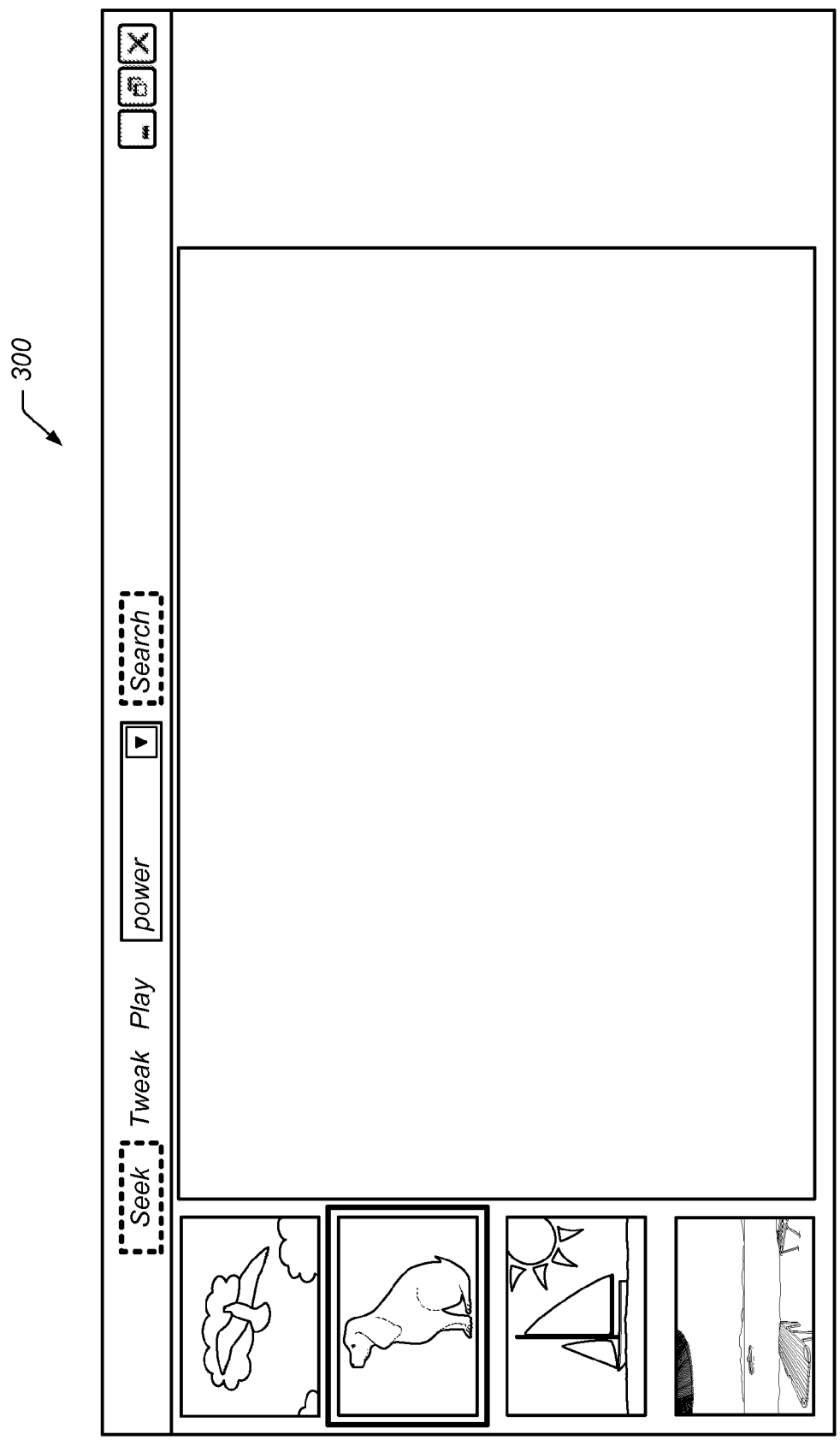
FIGS. 3A-3E illustrate the use of an image search module, according to one embodiment.

FIG. 3A illustrates the selection of a reference image for an image search using visual criteria, as described herein. In this example, four images are displayed in the active image frame, and the user has selected an image of a dog, as evidenced by the thick line around the image of the dog. In various embodiments, selection of the reference image may be performed using any of a variety of user interface mechanisms, such as a mouse, track ball, or touch pad to position a cursor or other selection tool over the reference image, for example. At this point, prior to performing the search, the search results frame is empty. In this example, the user has selected menu items "seek" and "search" from the menu frame to initiate a search using visual criteria based on the image of the dog as a reference image. In some embodiments, the image search module may be configured to prompt the user to specify the type of visual search criteria to apply to the search, e.g., color, color distribution, content, content distribution, etc. (not shown). In other embodiments, the image search module may be configured to attempt to find images similar to a selected image using all such visual search criteria, or using a predefined or default set of visual search cues that are applicable to the reference image. As previously noted, in some embodiments, the image search module may be configured to prompt the user to specify one or more search domains over which to perform the image search (not shown). In other embodiments, the image search module may be configured to search only local persistent storage, or may be configured to search over a pre-defined or default set of image sources (e.g., particular commercial image databases or public domain image databases).

Figure 3B:
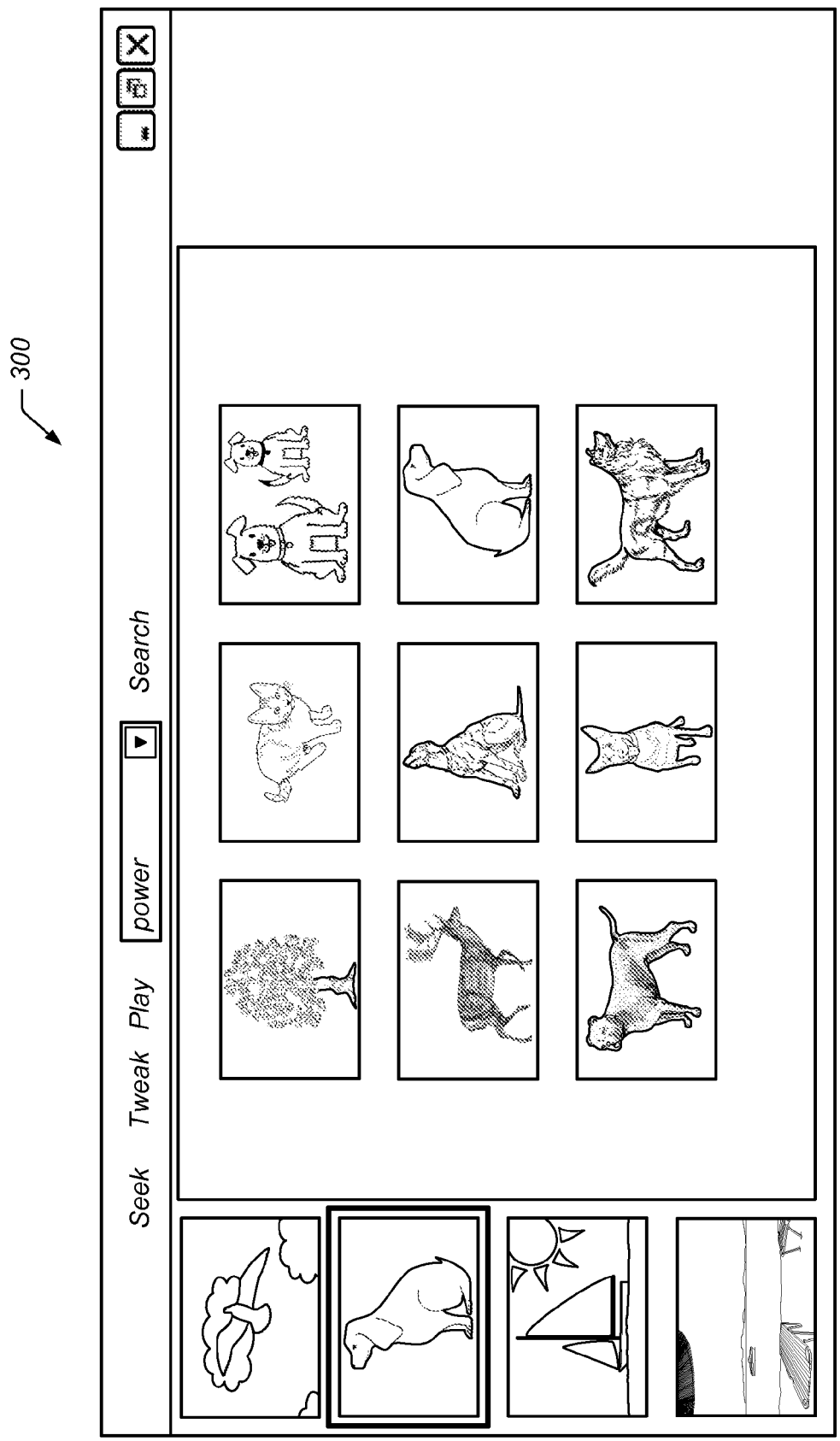

FIG. 3B illustrates the presentation of initial search results using the image of the dog as a reference. In this example, the initial search results include five images of individual dogs. These images may roughly match the content (dog) and content distribution (one dog centered in the image) of the reference image, and may or may not also roughly match the color or color distribution of the reference image. The initial search results also include one image of a cat. This image may also roughly match the content (small animal) and content distribution (one small animal centered in the image) of the reference image, and may or may not also roughly match the color or color distribution of the reference image. In this example, the initial search results also include an image of two dogs (which may be similar in color to the dog in the reference image), a deer (another animal centered in the image, which may be similar in color to the dog in the reference image and/or may be on a similarly colored background as the dog in the reference image), and an image of tree (which may include a similar distribution of colors—browns and greens) as the reference image. If the user is only interested in images of dogs, the user may further refine the search by adding a keyword "dog" to the search criteria, or may further refine the search by selection of a representative image from among the initial search results, as shown in FIG. 3C.

Figure 3C:
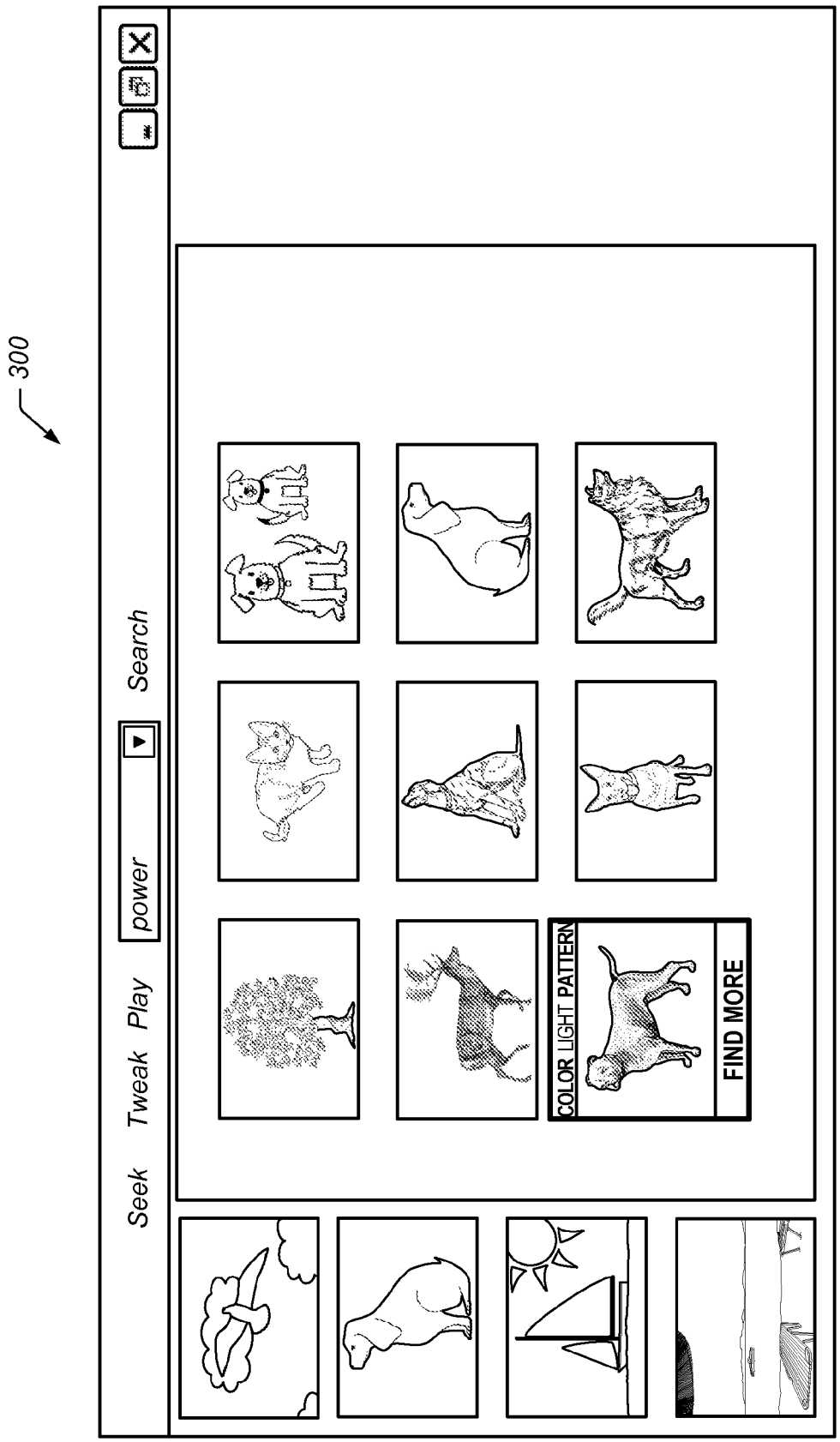

FIG. 3C illustrates the selection of a second reference image from among the initial search results as an image that best represents the visual criteria for which the user was searching. In this example, the user has selected an image of a single dog from among the initial search results in the search results frame. The selection of the second image may be performed using any of a variety of user interface mechanisms, such as those described above. In this example, in response to the selection of a second reference image, the image search module is configured to prompt the user to refine the search by specify the type of visual criteria to apply in the search, e.g., color, light, pattern. The user may select one or more of these and then select "find more" to initiate a refined image search using the two reference images and the selected visual search criteria (e.g., "color" and "pattern", which are shown in bold to indicate their selection).

Figure 3D:
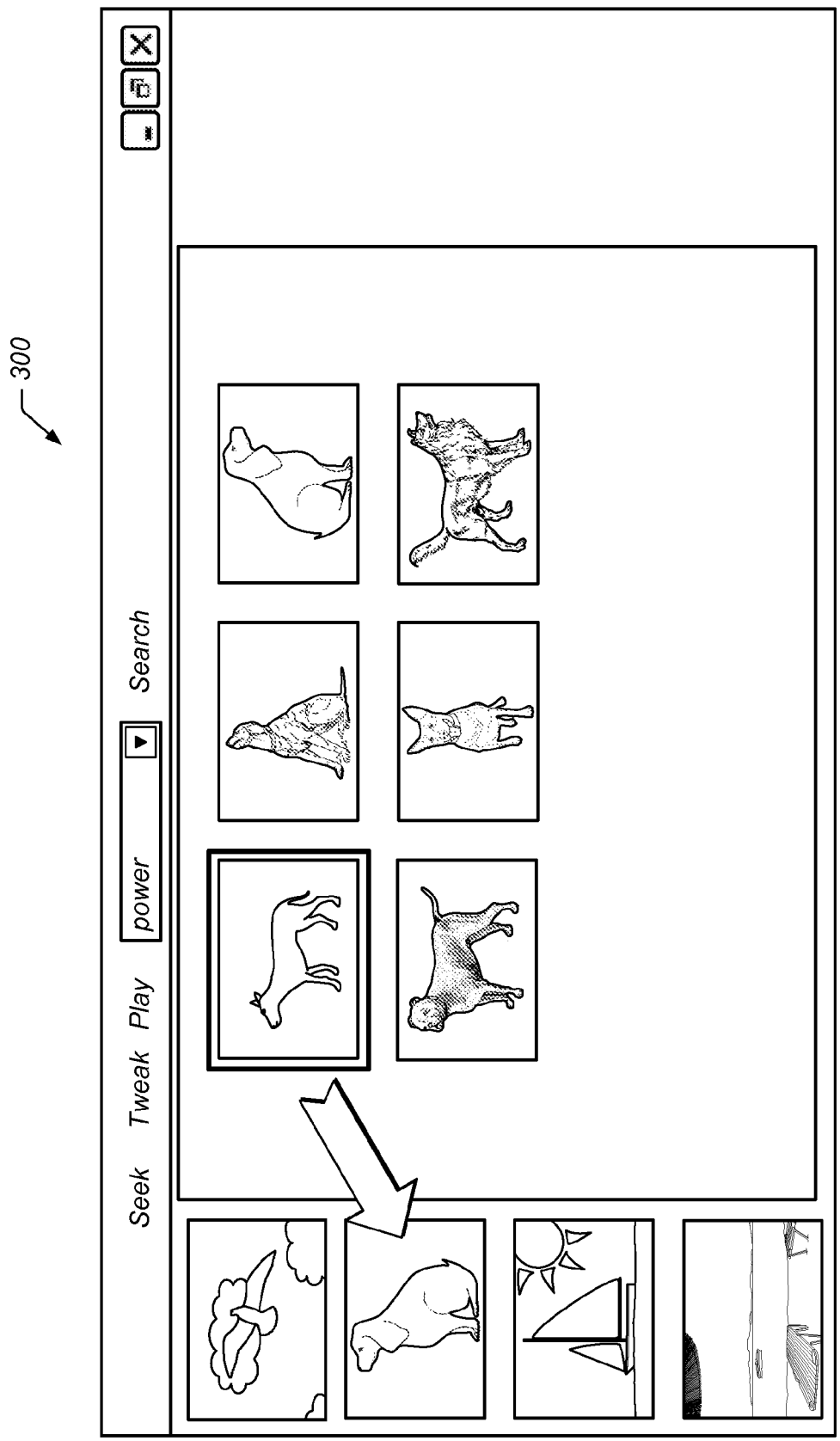
Figure 3E:
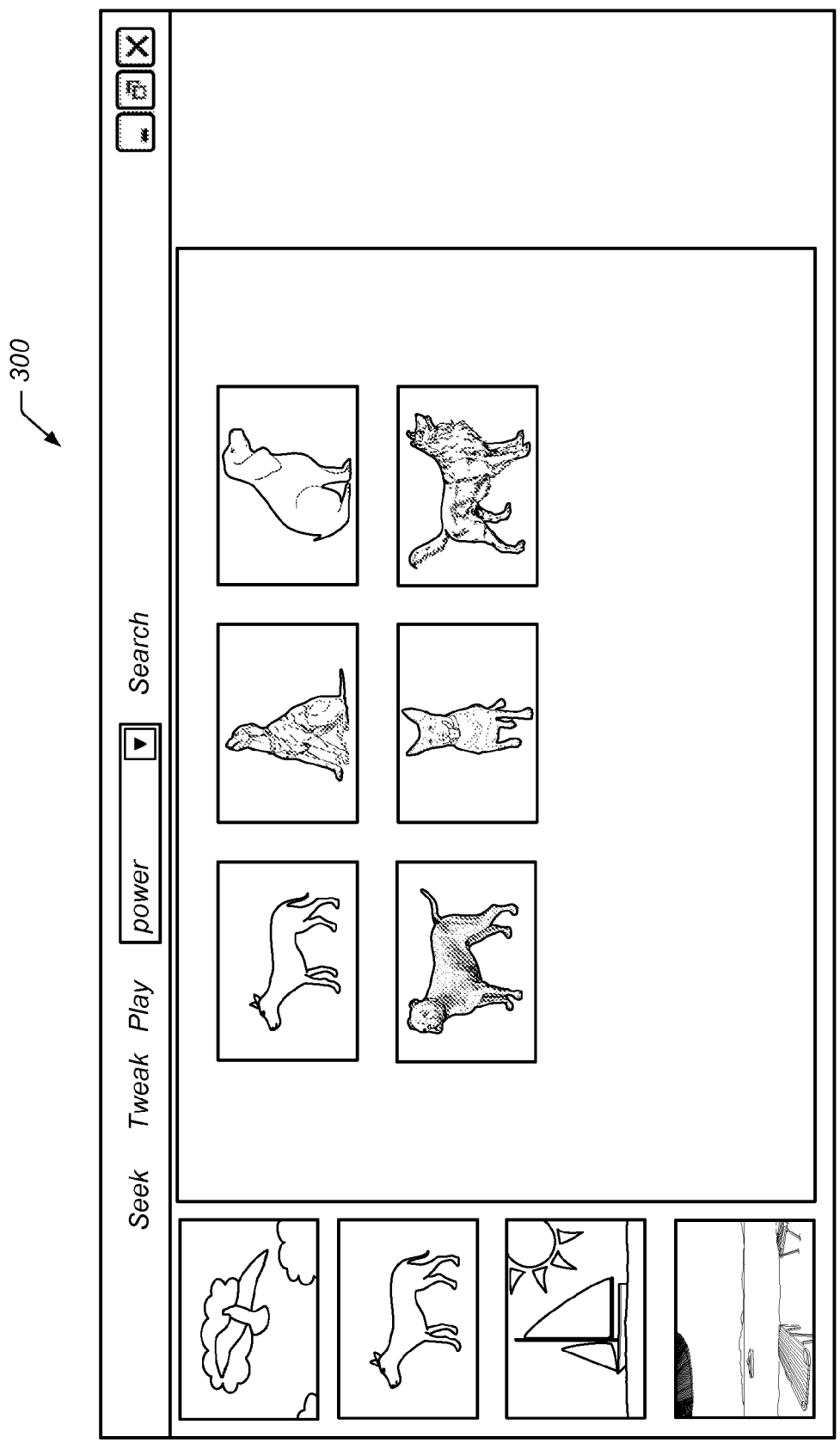

FIG. 3D illustrates the search results returned by the image search module in response to the refinement of the visual search criteria and the selection of a second reference image. In this example, the search results include six images of individual dogs. FIG. 3D also illustrates the selection of one of the images included in the search results (indicated by the thick outline) and the "dragging and dropping" of the selected image into the active image frame on the left side of window 300. FIG. 3E illustrates window 300 following the image search exercise described above. In this example, the addition of the new image causes the reference image in the active image frame to be removed from the active image frame (i.e. to be replaced by the newly added image). In other embodiments, adding an image to the active image frame may not cause other images to be removed from the active image frame. In this example, after adding the new image of a dog to the active image frame this image (or an image element thereof, e.g., the dog) may be merged with one or more other images as part of an image compositing exercise. An example of one such exercise is describe below in reference to FIGS. 6A-6I.

As previously noted, in some embodiments, an image compositing application may be configured to perform fast integration of gradient fields, which may allow advanced composition and editing operations to be performed on a composite image, or elements thereof, interactively in real-time. In some embodiments, the application may be configured to implement integration of gradient fields through the application of a method for fast approximation. In such embodiments, given a gradient field for an image and a set of constrains, the application may quickly approximate an intensity domain solution that meets the given set of constrains while retaining high visual quality.

Figure 4:
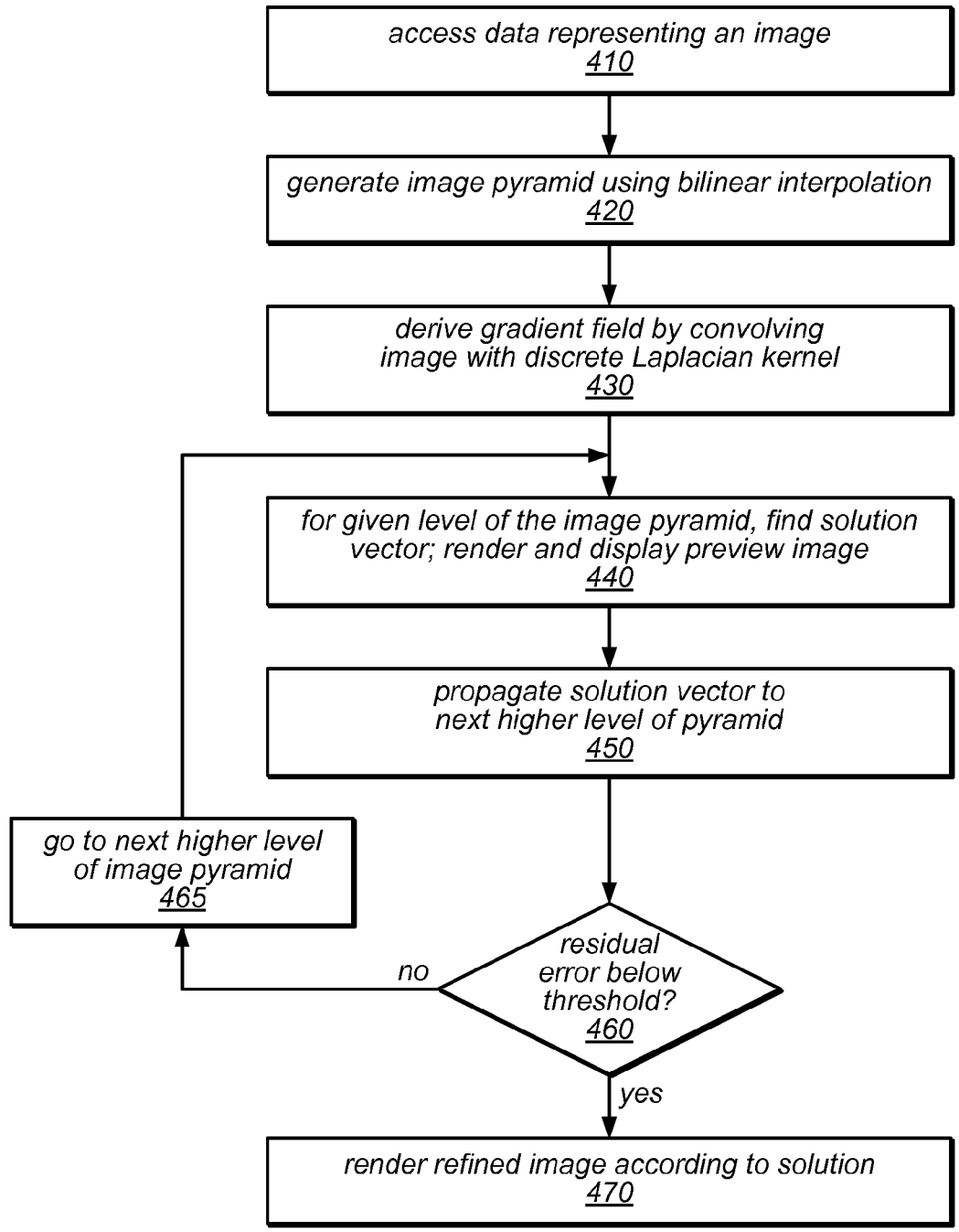
FIG. 4 illustrates a two-stage method for fast integration of a gradient field, according to one embodiment.

FIG. 4 illustrates a method for fast integration of a gradient field to extract an image element from its background, according to one embodiment. This method may be implemented as a module of an interactive image compositing application and/or in hardware (e.g., in a digital camera), in various embodiments. In this example, the image compositing application may be configured to access data representing an image A that a user wishes to manipulate in some way given a set of constrains, as in 410. For example, the application may access data representing an image A bounded by a roughly sketched perimeter around an element selected from an larger image, as described above. The image A may be represented as a two dimensional array of samples, in this example.

In the example illustrated in FIG. 4, the application may be configured to generate an image pyramid of the data, as in 420. For example, from the data representing image A, the application may be configured to build an image pyramid of increasingly lower resolution by bilinear interpolation, such that $A_0$ denotes the highest resolution representation of A, A1 denotes the representation having half the resolution of $A_0$ (i.e. the representation having one half the number of pixels of $A_0$ in the vertical and horizontal directions), and so on, where each representation $A_n$ denotes the image representing half the resolution of $A_{(n-1)}$.

As illustrated in FIG. 4, the application may be configured to derive a gradient field for the image, as in 430. For example, if $A_n'$ represents the gradient field of $A_n$, then the gradient field may be derived by convolving the image $A_n$ with the following discrete Laplacian kernel K:

|  | 0.25 |  |
|---|---|---|
| 0.25 | −1 | 0.25 |
|  | 0.25 |  |

In this example, for each pixel to be integrated:

$A_n'(x,y) = -A_n(x,y) + (A_n(x-1,y) + A_n(x,y-1) + A_n(x+1,y) + A_n(x,y+1)) * 0.25$

The kernel may vary in size and terms, in different embodiments. In some embodiments a small kernel may be used to derive the highest of frequencies.

As illustrated in FIG. 4, at each level of the pyramid starting with the bottom level (n) the application may be configured to find a solution vector ($S_n$) that meets the given constraints, as in 440. At this point (or at any point subsequent to this point) the application may also be configured to render and display a preview image, based on the approximate solution to that point. The application may be configured to promote that solution vector to the next level of the pyramid (n−1) and to use it as a starting point for a solution at that next level, as in 450. Propagating the solution vector $S_n$ to the next level in the pyramid $S_{n-1}$ may be done by nearest neighbor interpolation, in some embodiments.

As illustrated in FIG. 4, the application may in some embodiments be configured to continue refining the image (i.e. by moving to subsequent levels of the pyramid). In such embodiments, the application may be configured to find the solution vector by repeatedly evaluating and adjusting the solution vector until a specified maximum residual error is below a certain threshold, as shown in 460 and the feedback through 465 to 440 in FIG. 4. Once the residual error is below the threshold, shown as the positive exit from 460, the application may be configured to render the refined image according to the final solution vector, as in 470.

In the example described above, the gradient solver may include code similar in function to the following pseudo code:
While MaxError>some threshold
For each unknown in $S_n(x,y)$ $$S_n'(x,y)=(S_n(x-1,y)+S_n(x,y-1)+S_n(x+1,y)+S_n(x,y+1))*0.25-A_n'(x,y)$$

$$\text{Error}=|A_n'(x,y)-((S_n(x-1,y)+S_n(x,y-1)+S_n(x+1,y)+S_n(x,y+1))*0.25-S_n(x,y))|$$

If (Error>MaxError)
   MaxError=Error
Done
Done

Note that in some embodiments, initially (e.g., for the lowest resolution), the convergence may be fairly slow. However, as the solution propagates up the pyramid, making the starting point or initial guess more and more accurate, fewer and fewer iterations are necessary to reach a satisfying solution. Empirically, it may be shown that in order to provide an adequate visual result, it may only be necessary to run one or two iterations at the highest resolution levels.

In one embodiment, the method described above may be applied to the identification and extraction of an object of interest from an image. For example, an image comprising 512×512 pixels may be divided into a pyramid of six levels (512×512, 256×256, 128×128, 64×64, 32×32 and 16×16), and the method described above may be used with a constraint to match a certain intensity level along the edge of the object of interest (which may be a common case for seamless blending, cloning etc.).

A method for implementing and applying the fast gradient solver may be further described by way of example. In one example, the fast gradient solver described herein may be used to extract an object from the background of an image so that it may be inserted into another image. In this example, the fast gradient solver may be used to create a mask distinguishing pixels of the object of interest as foreground pixels and the remaining pixels of the image from which the object is to be extracted as background pixels. In this example, the fast gradient solver may be applied to a portion of an image selected by the user using a perimeter tool to roughly outline the object of interest in the image. The fast gradient solver may be applied to the problem of identifying the "edge" of the object, i.e. the points at which (when scanning the image from the rough perimeter toward the center) the pixels change from background pixels to foreground pixels. For example, if the image includes a square containing red tones (the object of interest) on a background of blue tones, the fast gradient solver may assign to each pixel within the area bounded by the rough perimeter a value indicating the probability that the pixel is a foreground pixel. In some embodiments, the value may be a binary indicator, for which one value indicates that the pixel is probably a foreground pixel and the other value indicates that the pixel is probably a background pixel.

In this example, the method includes building an image pyramid representing the pixels of the portion of the image bounded by the rough perimeter, and beginning processing on the lowest level of resolution in the image pyramid. For example, a six-level pyramid may be generated, as described above, and processing may begin by determining the probability that each pixel of the lowest-resolution image is a foreground pixel. In some embodiments, the fast gradient solver may apply various artificial intelligence techniques to determining whether each pixel at the current resolution is likely to be a foreground pixel. For example, the probability that a pixel on the rough perimeter is a foreground pixel may be assumed to be zero, while the probability that a pixel in the center of the area bounded by the rough perimeter is a foreground pixel may initially be assumed to be 100%. For each pixel in the area identified by the rough perimeter, the fast gradient solver may assign pixels as foreground or background pixels based on their proximity to the rough perimeter, as well as on their color or intensity values. In various embodiments, the fast gradient solver may be configured to distinguish between pixels of the object of interest and pixels of its background dependent on one or more of a distance of the pixels from pixels along the rough perimeter, color values of the pixels, intensity values of the pixels, or gradient values of the pixels. Differentiating between pixels based on gradient values may in some embodiments allow the fast gradient solver to take into account differences in texture content when distinguishing foreground pixels from background pixels. The solution at the lowest level of the pyramid may be determined as described above.

Note that in some embodiments, the fast gradient solver may be configured to use information provided by the user using an element of the graphical user interface of the interactive image compositing application as hints to the solution. For example, in one embodiment, the image composition application of which the fast gradient solver is a module may be configured to allow the user to mark a portion of the area bounded by the rough perimeter as being part of the object of interest or as being part of the background of the image. In such embodiments, the fast gradient solver may assign the probability indicator values of pixels in these marked areas with high confidence, and this may assist the solver in quickly converging on a solution at one or more levels of the image pyramid. In other words, in such embodiments, the fast gradient solver may be configured to distinguish between pixels of the object of interest and pixels of its background dependent on one or more pixels marked as being pixels of the object of interest or as background pixels, instead of, or in addition to begin dependent on their distance from pixels along the rough perimeter, their color values, their intensity values, and/or gradient values of the pixels.

In this example, after determining a solution for the lowest-resolution image, or at any point thereafter, an initial or interim solution may be presented to the user through the GUI interface of the image compositing application. As described herein, this may serve as a preview of the results of the current extraction and merging operation for the composite image under construction.

In this example, after determining a solution for the lowest-resolution image, processing continues at the next level of the image pyramid by scaling the solution up according to the resolution at the next level. At the next level, only the pixels identified as being along the edge of the object of interest by the lowest-level solution may need to be examined to refine the identification of the edge in the higher-resolution image. Therefore, fewer iterations of the fast gradient solver may need to be executed at each level of the image pyramid as processing moves up the pyramid. In this example, the solution is refined as processing moves up the pyramid, and this may continue until an acceptable solution (e.g., a visually pleasing result) is obtained. In some embodiments, the number of levels of the pyramid may be chosen by the user such that it is likely to produce an acceptable result, based on the resolution of the images being merged and the target resolution for the composite image. In other embodiments, the number of levels in the image pyramid may be programmatically determined based on such criteria, or may be pre-defined in the image compositing application.

Note that if changes are made to the object of interest and/or if its position changes within the composite image, the fast gradient solver may be reapplied to the problem of extracting and merging the object of interest in the composite image on the fly in response to those changes. In some embodiments, the fast gradient solver may be applied at the lowest-resolution level of the image pyramid (in a first stage) as each change is made in the composite image, and then may be applied to higher-resolution levels (in a second stage) to refine the result only when the image compositing application is idle (i.e. when no user interactions are occurring) for a relatively long time period. Because of the integration of this high-performance sketch-and-refine editing model, the user may be able to interactively "play around" with the composite image (e.g., inserting, moving, and/or modifying one or more objects) and to observe the initial results in real time.

Note that while the examples described herein for application of the fast gradient solver involve its use in extracting image elements from one image and inserting them into another image as part of an image compositing or image completion exercise, the method may also be applicable in other operations in an image editing application or other graphics application, such as for image restoration, cloning, healing, stitching, tone mapping, noise reduction and image compression. In addition, due to its performance (in terms of speed of execution) as well as the low complexity of implementation, the method may also be suitable for implementation in hardware (e.g., in a digital camera). However, as discussed above, the performance of the fast gradient solver may make it especially well suited for image composition operations, allowing them to be implemented interactively in real time.

Figure 5:
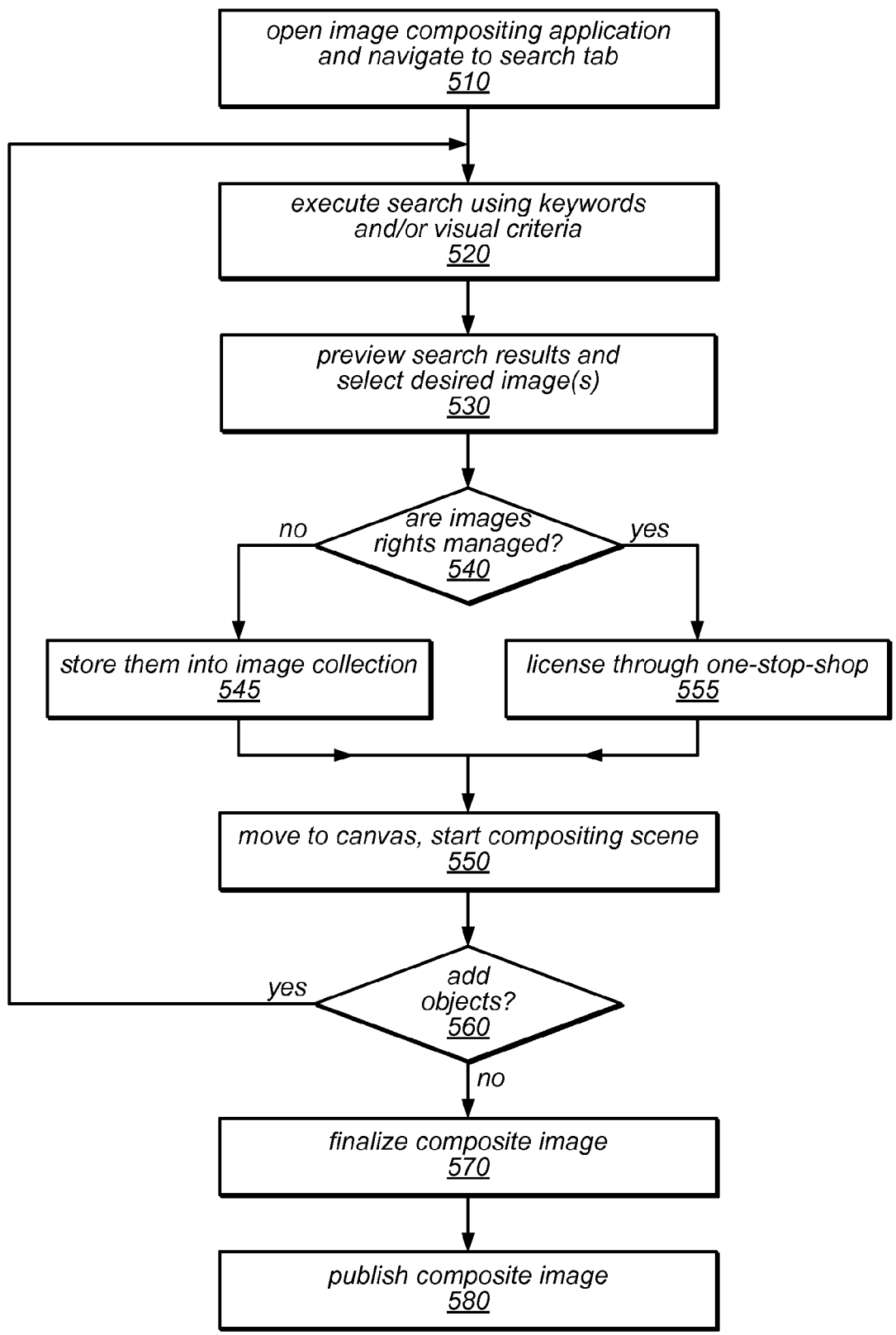
FIG. 5 illustrates a method for using an image compositing application to compose an image, according to one embodiment.

One method of using the image compositing application to construct a composite image is illustrated in FIG. 5, according to one embodiment. In this example, a user may open (or invoke) the image compositing application and navigate to the search tab, as in 510. The user may execute a search for image(s) using keywords and/or visual search criteria, as described above. This is shown as 520. The user may preview the search results and select one or more desired images, as in 530.

In this example, if one or more of the desired images is rights managed (i.e. if it must be licensed before being use in a composite image) the user may be prompted to purchase a license for the image(s) using a one-stop-shop feature of the image search module. This is shown as the positive exit from 540 and 555. In this example, any images that are not rights managed may be stored by the user into an image collection (e.g., a private or shared image collection in persistent storage, or a collection of "active" images in memory local to the application for the duration of a composition project). Once the desired images have been obtained, the user may move to the "canvas" tab of the image compositing application and start compositing an image (e.g., a scene) using one or more whole images and/or one or more image elements selected from images in the user's image collection(s), as in 550.

If the user desires additional image elements not found in the user's current image collection(s), the user may perform any number of additional searches to locate and obtain those elements. This is illustrated in FIG. 5 as the feedback from 560 to 520. Once the user has added all of the elements desired in the composite image, shown as the negative exit from 560, the user may finalize the composite image, as in 570. For example, once multiple image elements have been merged into the composite image, the user may wish to adjust the size, location, or appearance of one or more of the objects to enhance the composite image. As described above, the image compositing application may provide various editing tools and functionality to modify the color, contrast, brightness, size, orientation, aspect ratio, and/or other parameters of any of the inserted objects, and/or may duplicate or generate mirror images of them, without affecting the underlying (background) image of the composite image or any of the other inserted objects. Similarly, the user may apply various editing operations to the underlying image of the composition image without affecting any of the inserted objects. Once the composite image is finalized, the user may publish the composite image, as in 580. For example, the user may be a graphic artist who produces composite images for marketing materials or advertising, and may publish the composite image on a website or may export it for use in printed materials, in different embodiments.

The use of an integrated image compositing application may be further described by way of a second example. FIGS. 6A-6I illustrate the use of an integrated image compositing application to perform scene completion, according to one embodiment. In this example, a user interface window 600 of an image compositing application displays various frames that may be visible to a user during an image compositing operation. In FIGS. 6A-6I, active images (i.e. those currently available for selection and merging into a composite image) are displayed in a frame on the left side of window 600, user interface elements (e.g., slider bars) usable to invoke various image editing tools (e.g., to adjust the scale, color, or other parameters of an image or an object thereof) are displayed in a frame along the right side of window 600, and the composite image in progress is displayed in a large central frame in window 600.

Figure 6A:
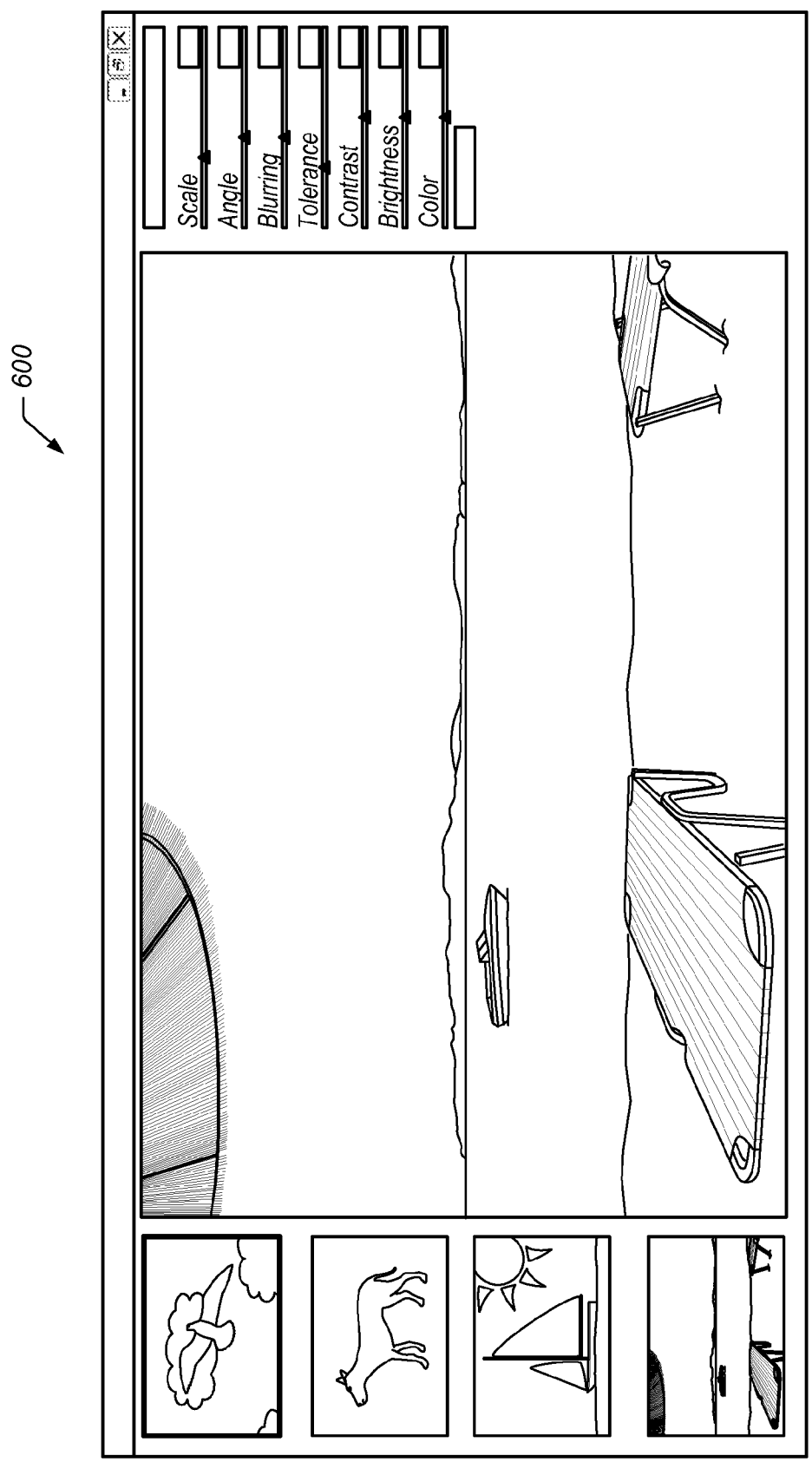
FIGS. 6A-6I illustrate a method for implementing scene completion in a graphics application, according to one embodiment.
Figure 6B:
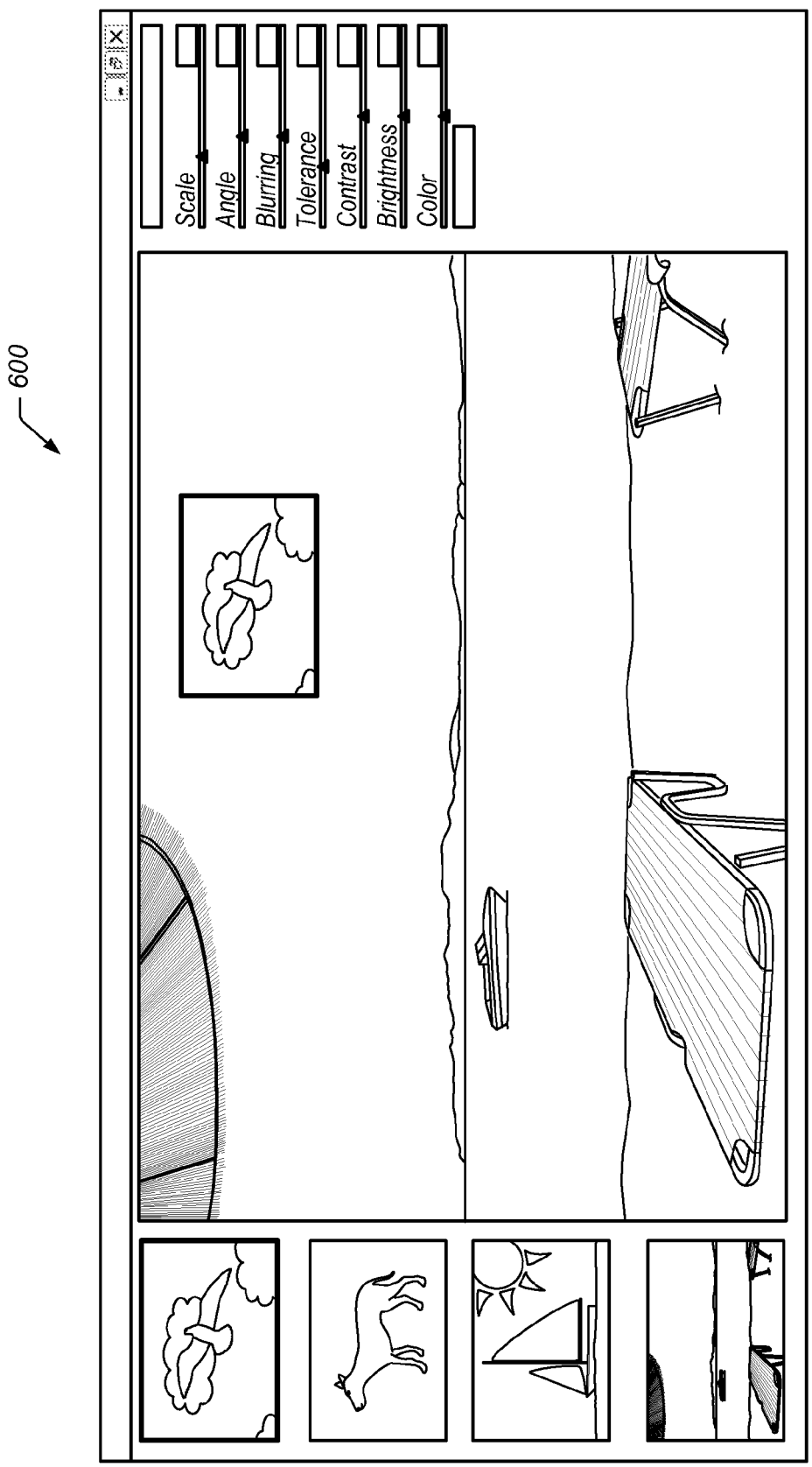

FIG. 6A illustrates an image of a beach scene in the central frame. In this example, the beach scene image was selected by the user from among the images in the active image frame to be the starting point for a composite image. FIG. 6B illustrates the selection (as indicated by the thick outline) of an image of a bird in the sky. This image will be merged with the beach scene image at the position in which it was placed in the image by the user. For example, the user may have first selected the bird image (e.g., using a selection tool) and then may have placed the bird image using another tool. In other embodiments, the bird image may be selected and positioned in a single user operation using a drag-and-drop type editing mechanism. As illustrated in FIG. 6B, the bird image is displayed superimposed on the image of the beach scene, and the background of the bird image does not match the background of the beach scene.

Figure 6C:
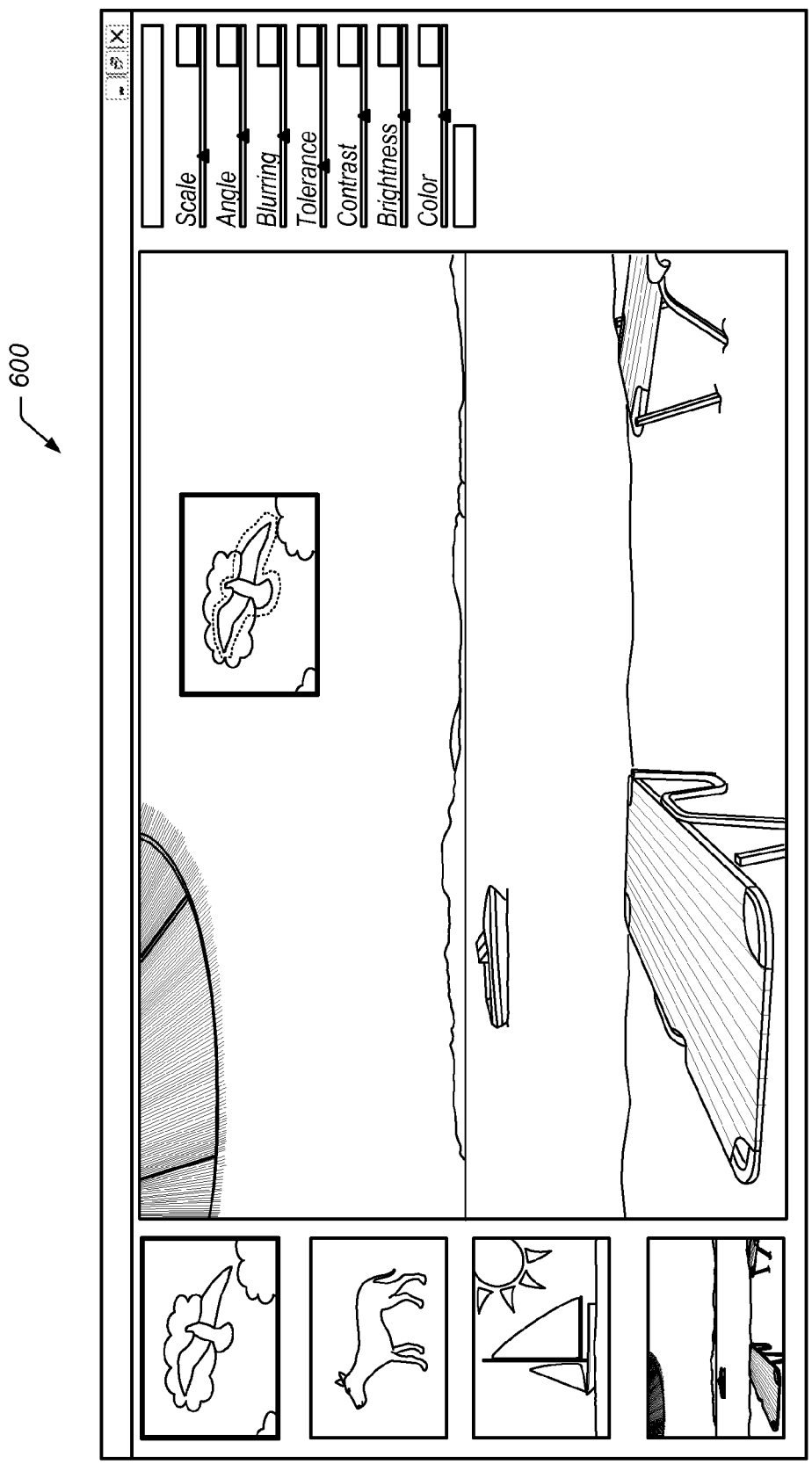
Figure 6D:
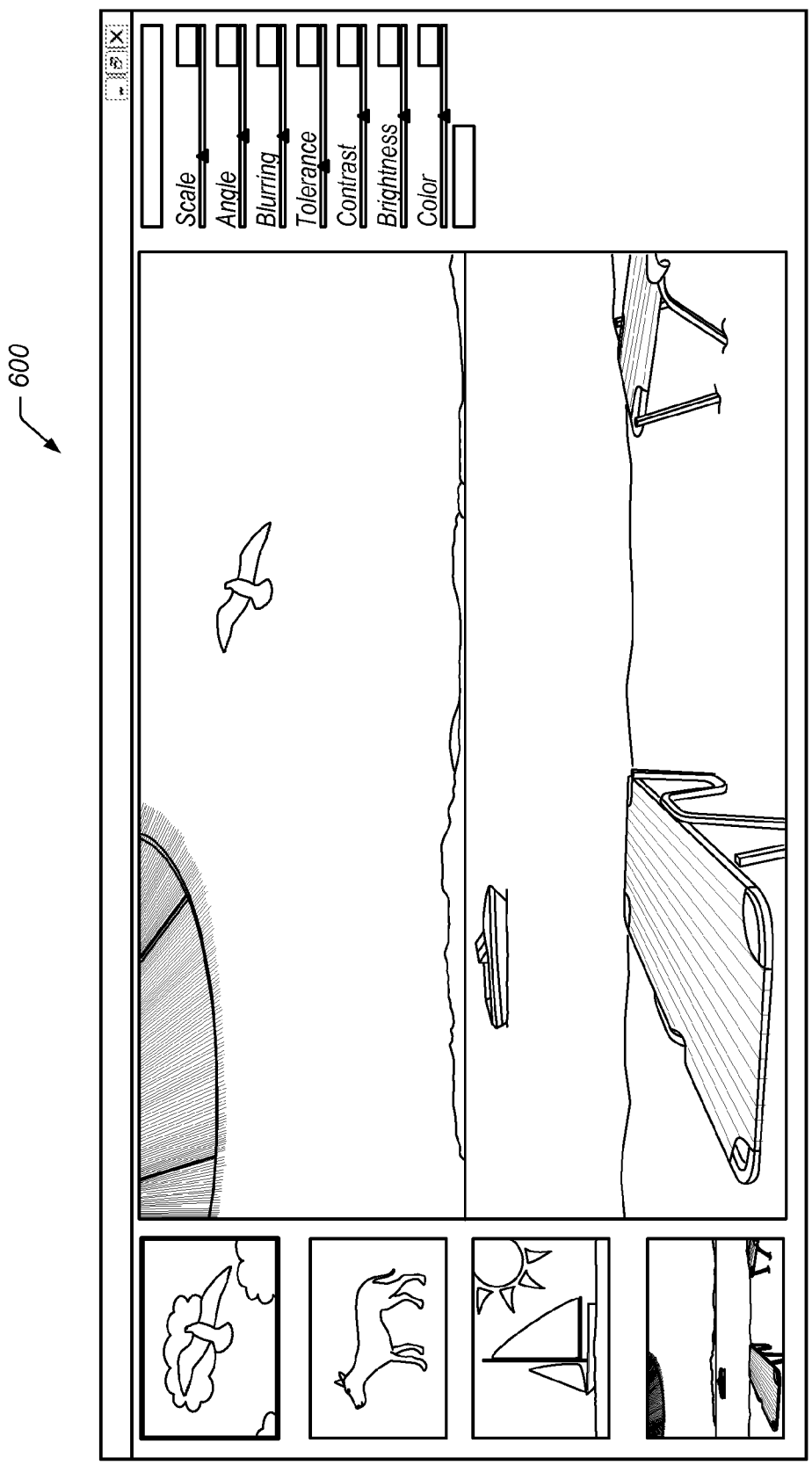

FIG. 6C illustrates the selection of an image element, or object, of interest from within the new image (i.e. the bird). In this example, the image compositing application may be configured to provide a rough sketching tool or "perimeter tool" with which the user may roughly outline the perimeter of an object of interest or roughly place a polygon around the object of interest to give an initial indication of an object to be extracted from the new image and merged with the background of the beach scene in the composite image under construction. FIG. 6C shows that the user has sketched a rough outline around the bird in the bird image, indicating that it should be extracted from its own background (a cloud-filled sky) and merged with the clear, blue sky of the beach scene background. In some embodiments, the image compositing application may be configured to apply the fast two-stage gradient solver described above to quickly render a preview of the result of this extraction (e.g., to quickly display the results of the first stage) when the user releases the selection tool (i.e. the rough sketching tool). The results are illustrated in FIG. 6D. In FIG. 6D, a preview of a composite image, generated by the fast gradient solver in a first stage is displayed in the central frame of window 600. In the preview image, the bird extracted from the bird image appears as if it has been inserted into the beach scene image. In this example, the results may be further refined in a subsequent rendering stage, as described above. In various embodiments, objects added to a composite image are separately editable, i.e. the pixels of an added object do not replace the pixels of the underlying image with which it was merged. Instead, data representing each object is stored separately and is operated on independently, as if the object were an overlay in the composite image. In this way, changes may be made to the newly added object without affecting any other images (or objects thereof) in the composite image or in persistent storage.

Figure 6E:
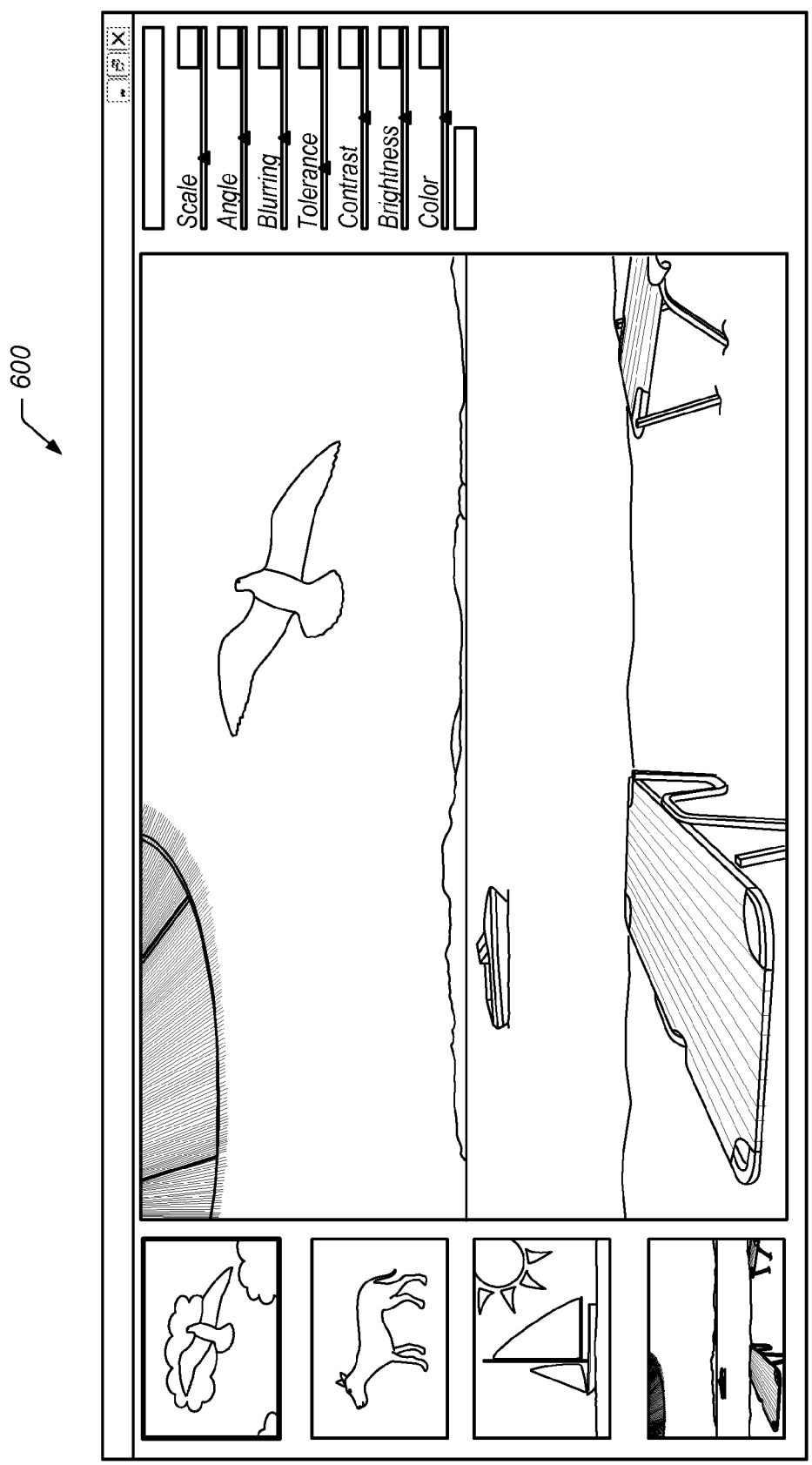

After placing a new image in the composite scene and selecting an object thereof for extraction and merging, the user may wish to modify the new object for a more pleasing visual result. For example, the user may wish to scale the new object to be more realistic in the scene into which it was dropped, and/or to modify the color, brightness, contrast, etc. to better match the look of the rest of the composite image. In some embodiments, the image compositing tool may provide mechanisms for the user to specify modifications and adjustments to be made on a selected object (e.g., the newly added bird.) FIG. 6E illustrates the result of the user increasing the scale of the bird (e.g., using a slider bar in the tool frame of window 600), following its initial placement and merging. As described above, any modification of an object may operate only on the object itself and not on any other images or objects included in the composite image.

Figure 6F:
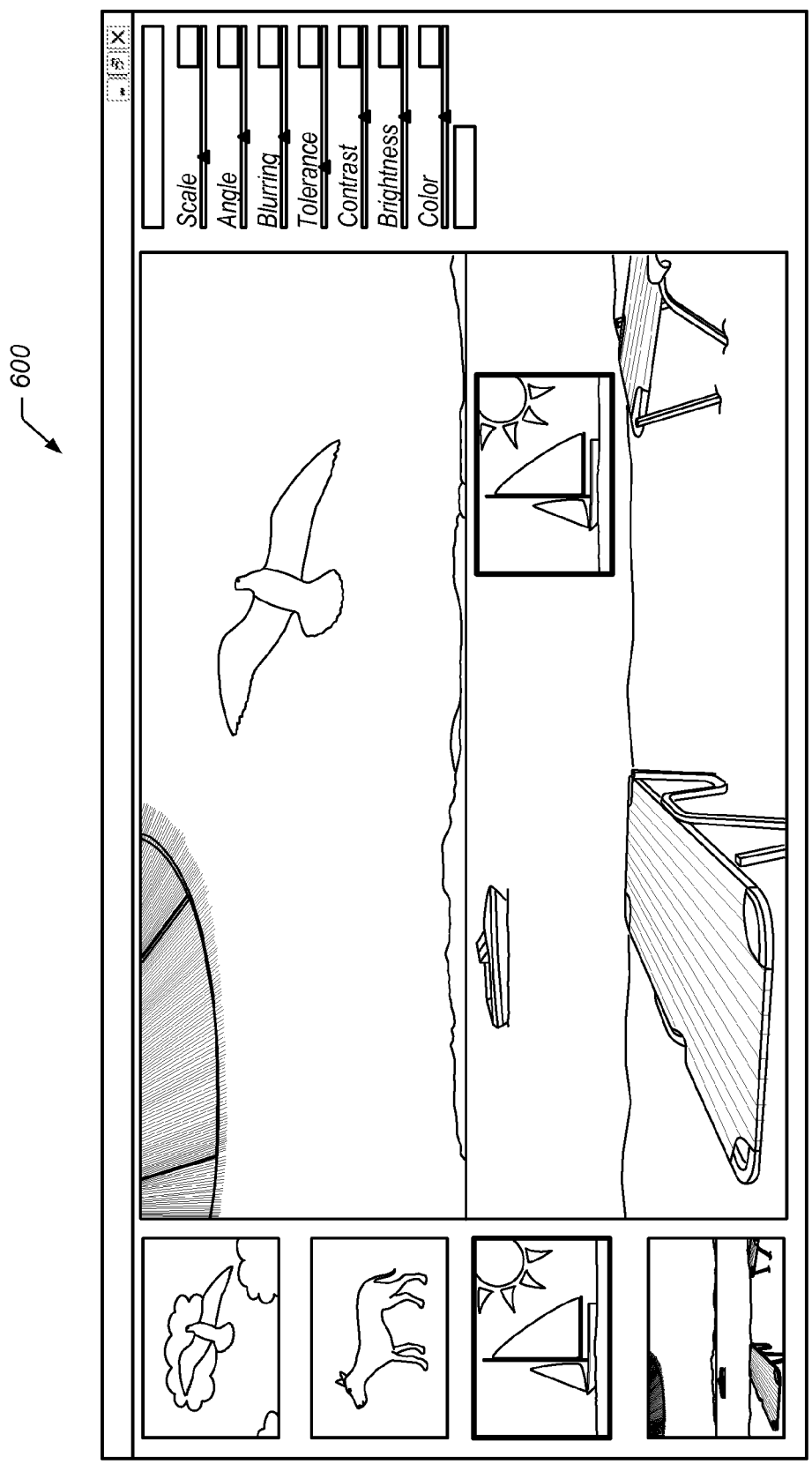
Figure 6G:
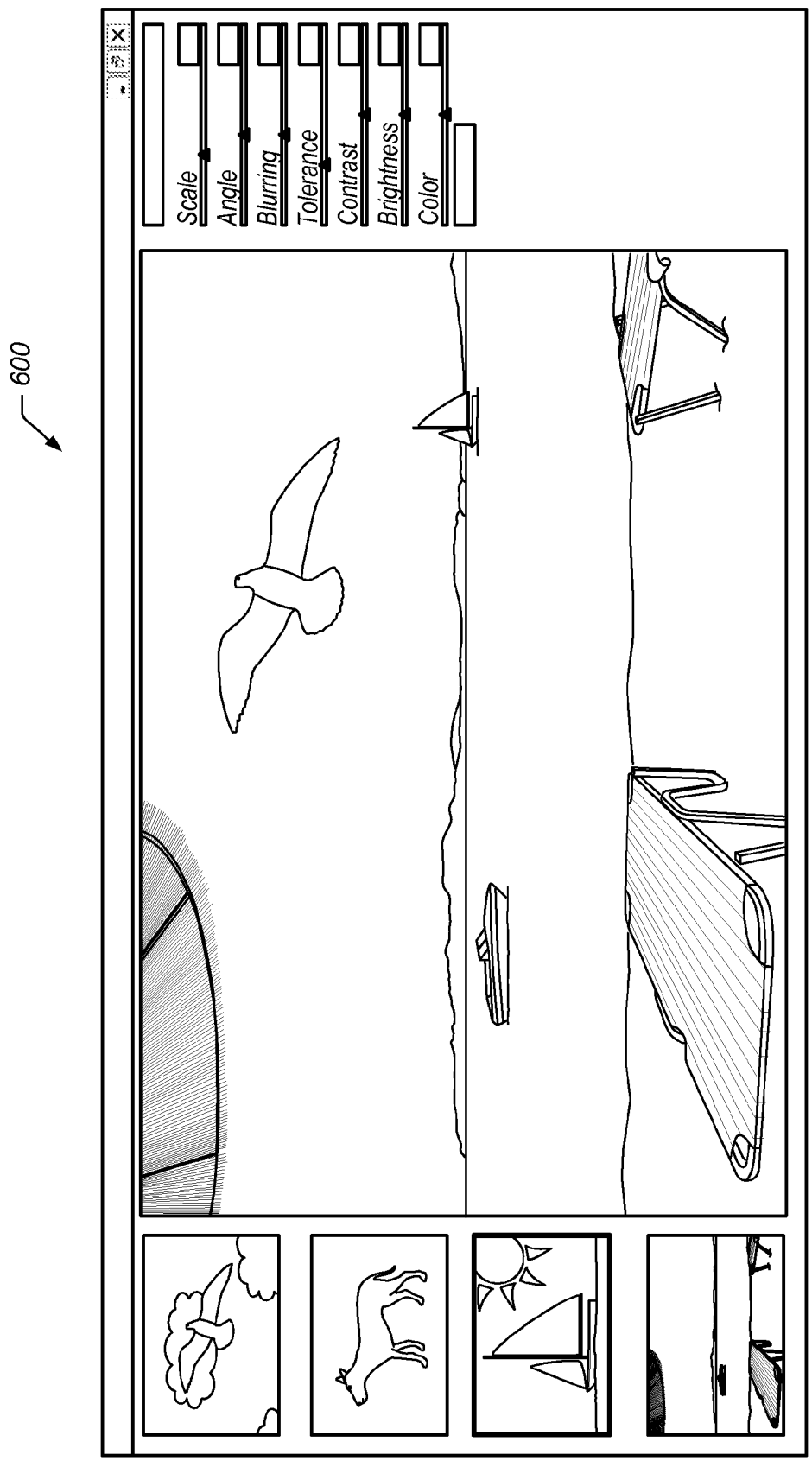

FIGS. 6F and 6G illustrate the addition of another object in the composite image. In this example, an image of a sailboat in the water on a sunny day is selected for the composite image. As in the previous example, the sailboat may be extracted from the own water and sky background and merged with the background of the beach scene image in the composite image in response to the user identifying the sailboat as the object of interest in the image (e.g., via a rough sketching tool). As illustrated in FIG. 6G, the sailboat may then be placed in the composite image and appropriately scaled down such that it appears to be the correct scale for a sailboat far from the shore in the beach scene.

Figure 6H:
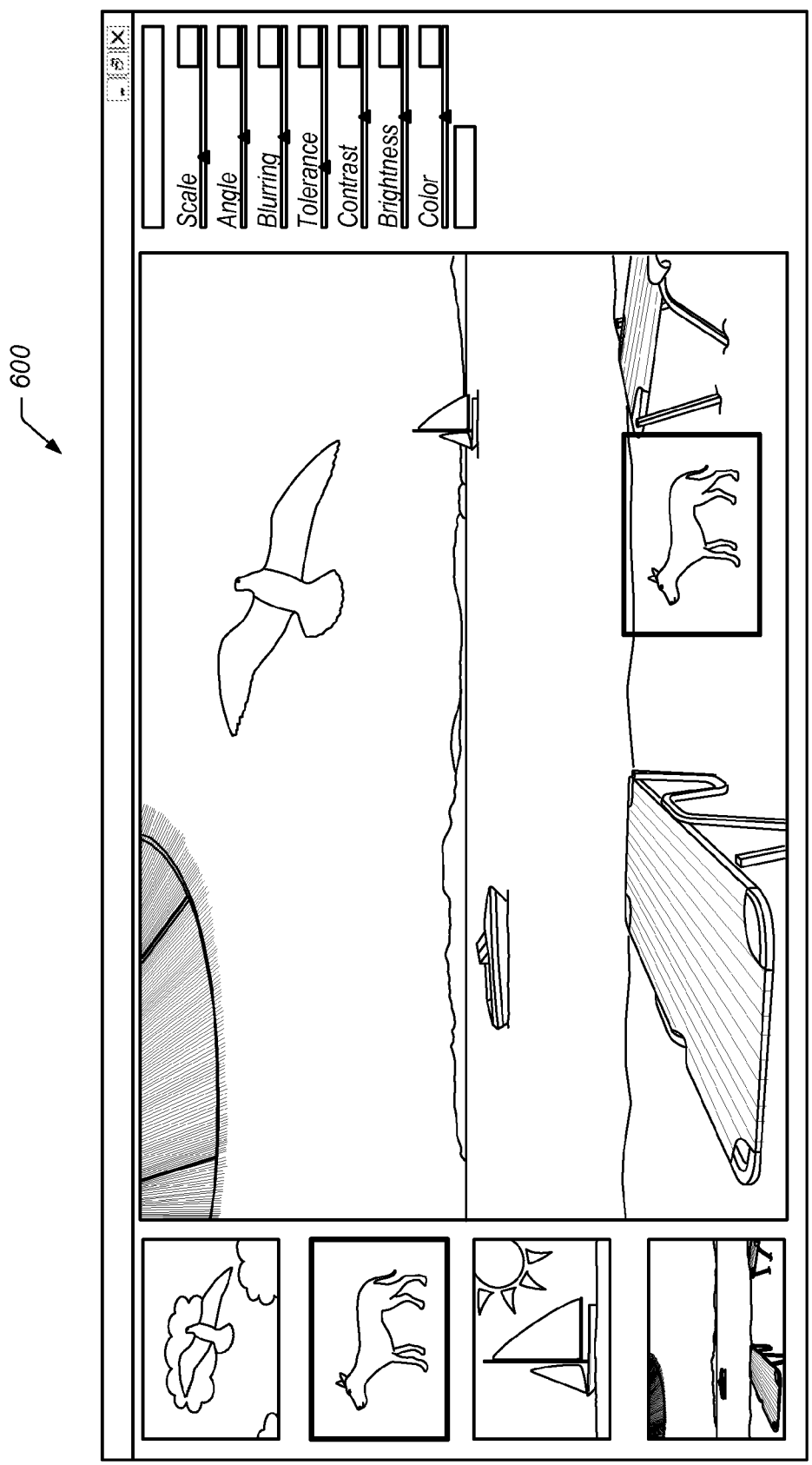
Figure 6I:
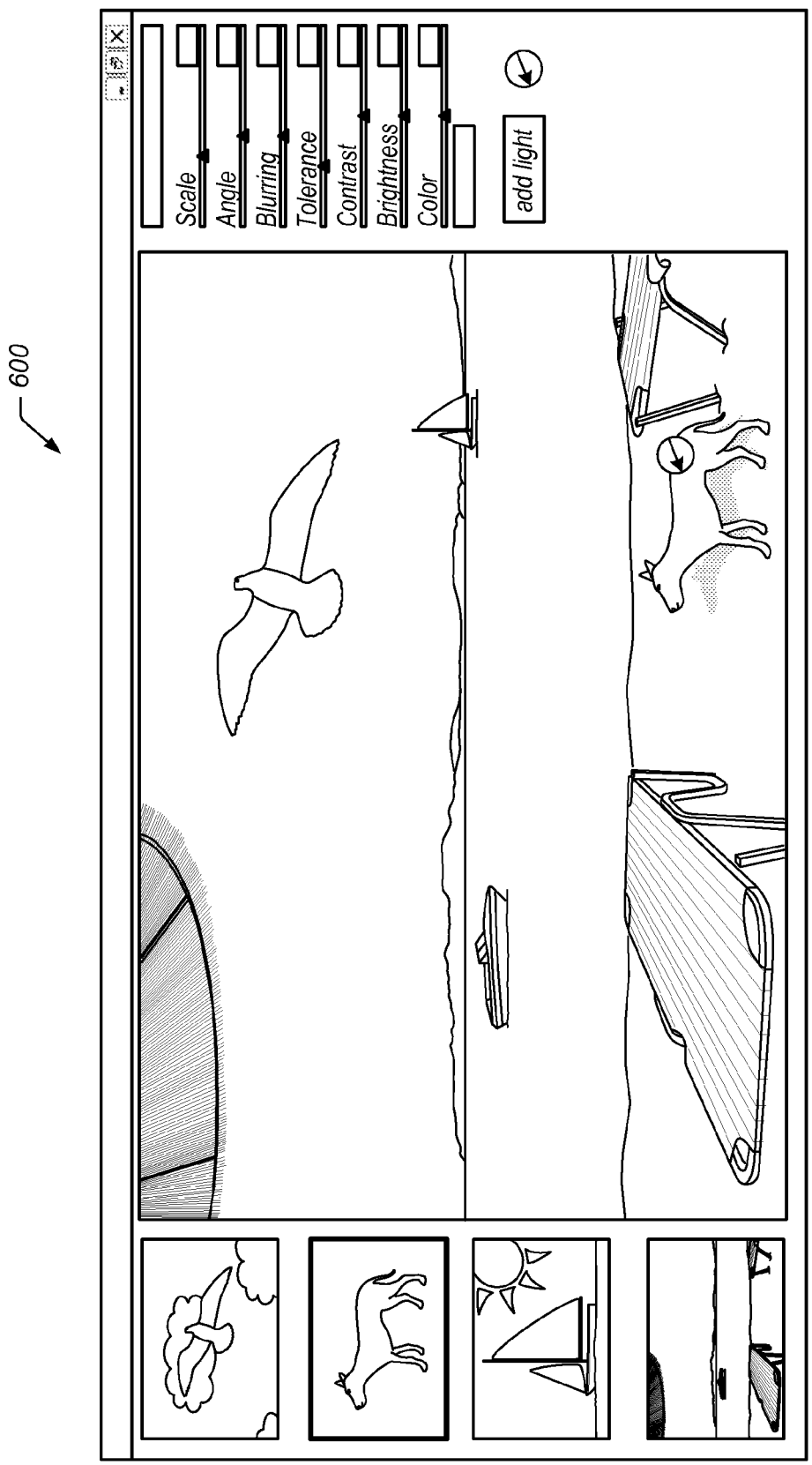

FIGS. 6H and 6I illustrate additional features of the image compositing application, according to one embodiment. FIG. 6H illustrates the use of visual search criteria in the integrated application. In this example, the image of the dog that was selected from search results using visual search criteria is selected for inclusion in the composite image. Again, the dog may be roughly outlined to identify it as the object of interest, and may be extracted from its own background and merged with the sand background of the beach scene in the composite image. FIG. 6I illustrates the integration of a shadow generating module of the image compositing application, according to one embodiment. In this example, an "add light" tool is selected from among the editing tools in the tool frame of window 600. The application may provide this tool to allow the user to specify a point and an angel at which a light source is assumed to be illuminating an object. In this example, the "add light" tool has been placed toward the rear of the dog object, indicating a point at which the light source meets the object, and the arrow indicates the direction of the light from the light source. In this example, the shadow generating module of the image compositing application computes the effect of the light source and the blockage of the light due to the object, and renders the object along with an appropriate shadow in the composite image. With the addition of the bird in the sky, the sailboat in the water, and the dog on the beach, and following any modifications to any of these objects, the scene may be considered complete by the user, and data representing the completed image may be exported, saved in local memory, written to persistent storage, displayed, printed, and/or published on a website, in various embodiments.

Note that once a composite image is exported from the image compositing application, the exported composite image may be implemented as data representing the composite image as a whole (i.e. using flattened image data, rather than treating the inserted objects as separately editable elements of the composite image). Therefore, subsequent operations on the composite image (e.g., color or color balance changes or resizing operations) may affect both the original image elements and the inserted image elements, in a single operation.

Figure 7:
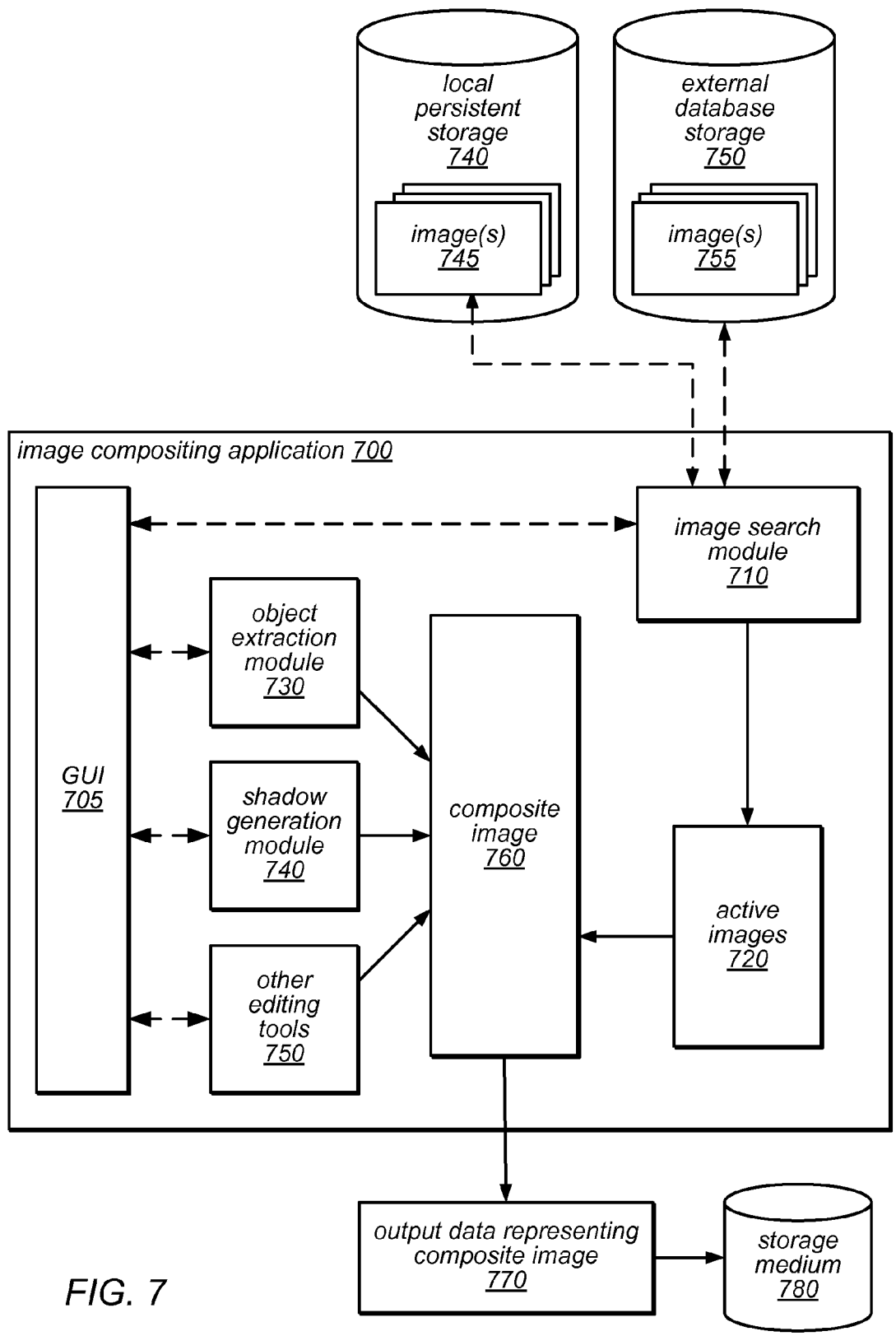
FIG. 7 illustrates various elements of an image compositing application, according to one embodiment.

As described herein, an image compositing application may in some embodiments provide a framework for the integration of interactive image searching capability using visual searches, non-destructive image compositing, and a high-performance rendering model employing a fast gradient solver. Such an application may streamline the image discovery, image acquisition, and compositing operations into an efficient workflow for users. One such image compositing application is illustrated in FIG. 7, according to one embodiment. In this example, an image compositing application 700 includes a graphical user interface (GUI) 705, such as the user interface described herein and illustrated in FIGS. 3A-3E and 6A-6I.

Graphical user interface 705 may provide a user with access to various editing tools and search capabilities usable to operate on a composite image, as described herein. For example, in the embodiment illustrated in FIG. 7, GUI 705 may provide the user access to image search module 710, object extraction module 730, a shadow generation module 740, and other editing tools 750. These modules and tools may be usable to find and acquire images, merge them with other images (i.e. extracting objects from the background of the images and blending them with the background of another image), and modify various parameters of the merged images and objects thereof to create a composite image, as described herein.

In this example, image compositing application 700 also includes one or more data structures for storing or referencing a collection of active images (shown as 720), e.g., structures storing data representing active images in memory local to image compositing application 700 during composition of an image, and a data structure 760 storing data representing the composite image itself (e.g., storing data representing the composite image in memory local to image compositing application 700 while in the process of constructed and/or modifying the composite image).

In the example illustrated in FIG. 7, image search module 710 may perform image searches dependent on user-specified keywords and/or visual criteria (e.g., based on a reference image), as described herein. In this example, image search module 710 may have access to local persistent storage 740 and/or external database storage 750 from which various images 745 and 755 may be returned in response to a userinitiated search for images. In response to user-selection of images from among the search results, image search module 710 may acquire the selected images and may ad them to active images 720 for use in a current or subsequent compositing exercise.

In various embodiments, once a compositing exercise has been completed, or at any intermediate point in the exercise, data representing the composite image may be output, as in 770. For example, in response to user input, data representing the composite image may be exported from image compositing application 700 for publishing on a website, for display, or for printing, and/or may be written to a computer readable storage medium, such as storage medium 780 in FIG. 7, for archival purposes and/or to be accessible to image compositing application 700 or another application subsequent to the compositing exercise.

Figure 8:
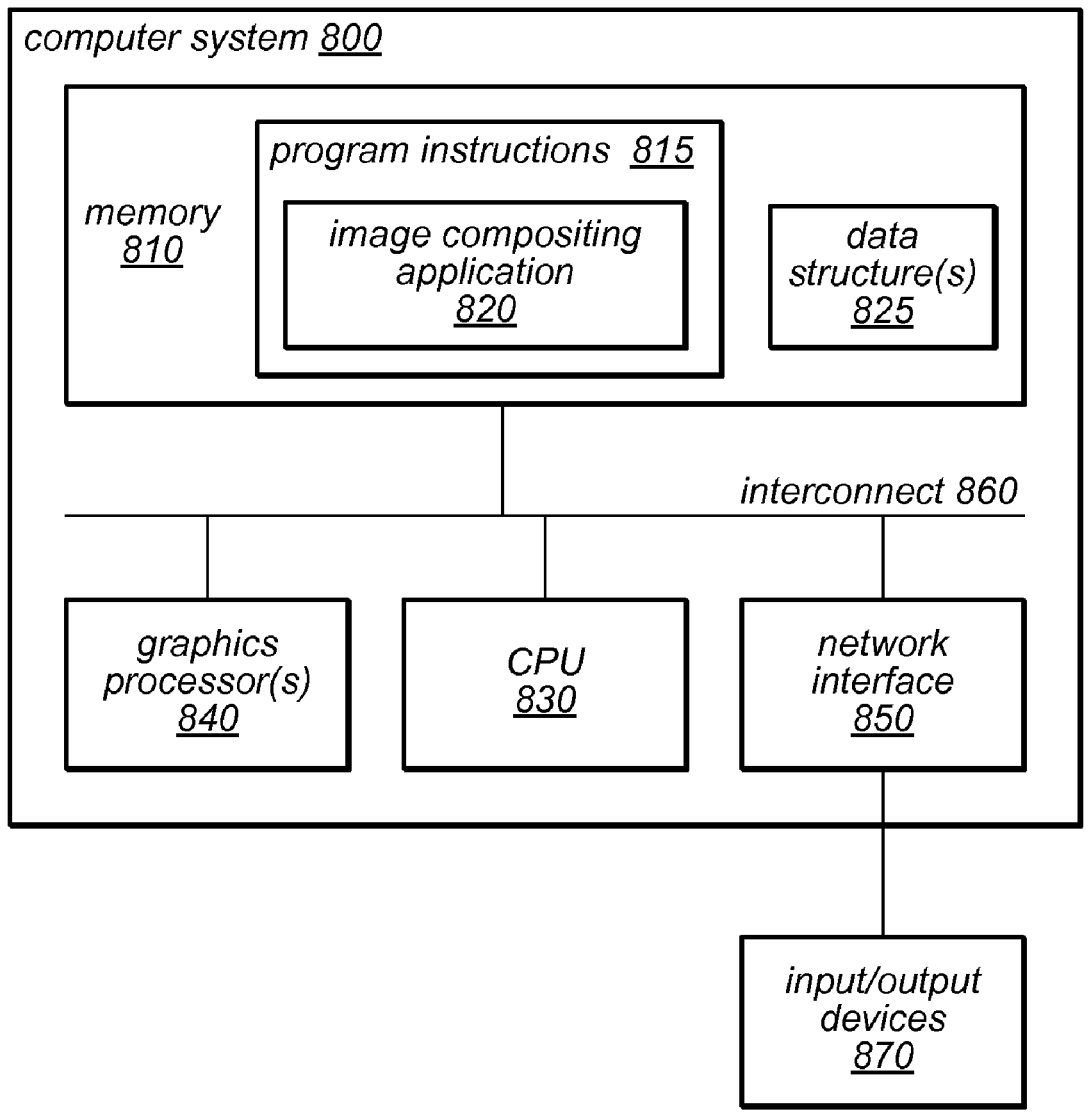
FIG. 8 illustrates a computer system configured to implement an image compositing application, according to one embodiment.

The methods described herein for advanced compositing and editing of images (e.g., within an integrated image compositing application) may be implemented by a computer system configured to provide the functionality described. FIG. 8 is a block diagram illustrating one embodiment of a computer system 800 configured to implement such image compositing operations. An image compositing application such as image compositing application 820 may be configured to perform various image editing functions and to render new images accordingly. In some embodiments, a user may invoke operations to search for and/or acquire images, merge objects or entire images with other images, or otherwise alter an input image (or portion thereof) through a user interface of image compositing application 820. Image compositing application 820 may be configured to perform these operations using a visual search module, a fast gradient solver, a shadow generation module, and other editing tools, according to various embodiments, and may employ the methods described herein for compositing images within the integrated framework provided by image compositing application 820. Image compositing application 820 may be configured to render the reconstructed image to a separate window, or directly into the same frame buffer containing the input image, in different embodiments.

Image compositing application 820 may represent various types of graphics applications, such as painting, publishing, photography, games, animation, and other applications that may include program instructions executable to provide the functionality described herein. Additionally, image compositing application 820 may utilize a graphics processor 840 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 840 may implement a number of graphics primitive operations in a way that makes executing them much faster than drawing directly to the screen with a host central processing unit (CPU), such as CPU 830. In various embodiments, the methods disclosed herein for image compositing may be implemented by program instructions configured for parallel execution on two or more such GPUs. The GPU 800 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, image compositing application 820 may, in some embodiments, be part of, or performed by, one or more graphics processors, such as graphics processor 840. As described above, in some embodiments image compositing application 820 may be configured to render merged and/or modified images into a different window than input images.

Advanced compositing and editing of images, as described herein, may be implemented on various types of computer systems. Referring again to FIG. 8, computer system 800 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Image compositing application 820, which may be configured to implement image search operations, image acquisition, image composition, and various image editing operations, as described herein, may be provided as a computer program product, or software, that may include a computer-readable storage medium having stored thereon instructions, which may be used to program a computer system (or other electronic devices) to implement image compositing using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 8, computer system 800 may include one or more processor units (CPUs) 830. Processors 830 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system (s) may be run on computer system 800, such as various versions of Unix, Linux, Windows™ from Microsoft Corporation, MacOS™ from Apple Corporation, or any other operating system that enables the operation of software on a hardware platform.

The computer system 800 may also include one or more system memories 810 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 800 via interconnect 860. Memory 810 may include other types of memory as well, or combinations thereof. One or more of memories 810 may include program instructions 815 executable by one or more of processors 830 to implement aspects of the image compositing techniques described herein. Program instructions 815, which may include program instructions configured to implement image compositing application 820, may be partly or fully resident within the memory 810 of computer system 800 at any point in time. Alternatively, program instructions 815 may be provided to GPU 840 for performing image editing operations (or portions thereof) on GPU 840 using one or more of the techniques described herein. In some embodiments, the techniques described herein may be implemented by a combination of program instructions 815 executed on one or more processors 830 and one or more GPUs 840, respectively. Program instructions 815 may also be stored on an external storage device (not shown) accessible by the processor(s) 830 and/or GPU 840, in some embodiments. Any of a variety of such storage devices may be used to store the program instructions 815 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 830 and/or GPU 840 through one or more storage or I/O interfaces including, but not limited to, interconnect 860 or network interface 850, as described herein. In some embodiments, the program instructions 815 may be provided to the computer system 800 via any suitable computer-readable storage medium including memory 810 and/or external storage devices described above. Memory 810 may also be configured to implement one or more data structures 825, such as one or more data structures configured to store data representing one or more input images, composite images, intermediate images, and/or refined composite images, as described herein. Data structures 825 may be accessible by processor(s) 830 and/or GPU 840 when executing image compositing application 820 or other program instructions 815.

As shown in FIG. 8, processor(s) 830 may be coupled to one or more of the other illustrated components by at least one communications bus, such as interconnect 860 (e.g., a system bus, LDT, PCI, ISA, or other communication bus type), and a network interface 850 (e.g., an ATM interface, an Ethernet interface, a Frame Relay interface, or other interface). The CPU 830, the network interface 850, and the memory 810 may be coupled to the interconnect 860. It should also be noted that one or more components of system 800 may be located remotely and accessed via a network.

As noted above, in some embodiments, memory 810 may include program instructions 815, comprising program instructions configured to implement image compositing application 820, as described herein. Image compositing application 820 may be implemented in various embodiments using any desired programming language, scripting language, or combination of programming languages and/or scripting languages, e.g., C, C++, C#, Java™, Perl, etc. For example, in one embodiment, image compositing application 820 may be JAVA based, while in another embodiments, it may be implemented using the C or C++ programming languages. In other embodiments, image compositing application 820 may be implemented using specific graphic languages specifically for developing programs executed by specialize graphics hardware, such as GPU 840. In addition, image compositing application 820 may be embodied on memory specifically allocated for use by graphics processor(s) 840, such as memory on a graphics board including graphics processor(s) 840. Thus, memory 810 may represent dedicated graphics memory as well as general-purpose system RAM, in various embodiments. Memory 810 may in some embodiments also include a data store configured to store image data for one or more input images and/or output images, in various embodiments. Other information not described herein may be included in memory 810 and may be used to implement the methods described herein and/or other functionality of computer system 800.

Network interface 850 may be configured to enable computer system 800 to communicate with other computers, systems or machines, such as across a network. For example, an image search module of image compositing application 820 may perform images searches by accessing one or more external image databases via network interface 850. Network interface 850 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 800 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 850 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 840 may be implemented in a number of different physical forms. For example, GPU 840 may take the form of a dedicated graphics card, an integrated graphics solution and/or a hybrid solution. GPU 840 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 8, memory 810 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 840 and the rest of the computer system 800 may travel through a graphics card slot or other interface, such as interconnect 860 of FIG. 8.

Computer system 800 may also include one or more additional I/O interfaces, such as interfaces for one or more user input devices 870, or such devices may be coupled to computer system 800 via network interface 850. For example, computer system 800 may include interfaces to a keyboard, a mouse or other cursor control device, a joystick, or other user input devices 870, in various embodiments. Additionally, the computer system 800 may include one or more displays (not shown), coupled to processors 830 and/or other components via interconnect 860 or network interface 850. Such input/output devices may be configured to allow a user to interact with image compositing application 820 to request or invoke various image editing operations and/or to specify various search parameters, image editing parameters, and/or other configurable options available to the user when compositing images while executing image compositing application 820. For example, they may be configured to allow a user to select an object of interest contained within an image for merging with one or more other images, to identify an image from among a collection of image search results, etc. It will be apparent to those having ordinary skill in the art that computer system 800 may also include numerous other elements not shown in FIG. 8.

Note that program instructions 815 may be configured to implement an image compositing application 820 as a standalone application, or as a module of another graphics application or graphics library, in various embodiments. For example, in one embodiment program instructions 815 may be configured to implement graphics applications such as painting, publishing, photography, games, animation, and/or other applications, and may be configured to composite images as part of one or more of these graphics applications. In another embodiment, program instructions 815 may be configured to implement the image compositing techniques described herein in one or more functions called by another graphics application executed on GPU 840 and/or processor (s) 830. Program instructions 815 may also be configured to render images and present them on one or more displays as the output of an image compositing operation and/or to store image data for composite images, modified images (or objects thereof), and/or refined composite images in memory 810 and/or an external storage device(s), in various embodiments. For example, an image compositing application 820 included in program instructions 815 may utilize GPU 840 when merging, modifying, rendering, or displaying images in some embodiments.

While various image compositing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations described herein may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   a memory coupled to the one or more processors and storing program instructions executable by the one or more processors to implement an interactive image compositing application configured to:
      access data in persistent storage representing an image in response to selection of the image;
      display a copy of the image superimposed over another image;
      extract an object of interest from the copy of the image;
      merge the extracted object and the other image to generate and display a preview of a composite image in which the extracted object appears to be inserted in the other image; and
      subsequent to generating and displaying the preview, render a refined version of the composite image;
   wherein to render the refined version of the composite image, the application is configured to operate on a representation of a portion of the copy of the image that comprises the object of interest that is at a higher resolution than another representation of the portion of the copy of the image on which the application operates to generate and display the preview of the composite image.

2. The system of claim 1, wherein to extract the object of interest from the copy of the image, the interactive image compositing application is configured to extract the object of interest from the portion of the copy of the image, wherein the portion of the copy of the image is identified by a rough perimeter drawn around the object of interest using an element of a graphical user interface of the interactive image compositing application.

3. The system of claim 1, wherein to extract the object of interest from the copy of the image, the interactive image compositing application is further configured to apply a fast gradient solver of the interactive image compositing application to the other representation of the portion of the copy of the image to distinguish pixels of the object of interest as pixels of a foreground object and to remove any other pixels within the portion of the copy of the image identified by the rough perimeter as background pixels.

4. The system of claim 3,
wherein the portion of the copy of the image is identified by a rough perimeter drawn around the object of interest using an element of a graphical user interface of the interactive image compositing application; and
wherein said distinguishing pixels of the object of interest is dependent on one or more of: a distance of the pixels from pixels along the rough perimeter, color values of the pixels, intensity values of the pixels, or gradient values of the pixels.

5. The system of claim 3, wherein said distinguishing pixels of the object of interest is dependent on one or more pixels marked as being pixels of the object of interest or as background pixels using an element of the graphical user interface of the interactive image compositing application.

6. The system of claim 1,
wherein to generate and display the preview of the composite image, the interactive image compositing application is configured to apply a fast gradient solver of the interactive image compositing application to the other representation of the portion of the copy of the image; and
wherein the other representation is at a lower resolution than the copy of the image.

7. The system of claim 1, wherein to render the refined version of the composite image, the interactive image compositing application is configured to apply a fast gradient solver of the interactive image compositing application to the representation of the portion of the copy of the image that is at the higher resolution.

8. The system of claim 1,
wherein to extract the selected image element from the copy of the image, the interactive image compositing application is further configured to generate an image pyramid comprising two or more levels, each level of the image pyramid comprising data representing a respective version of the portion of the copy of the image having a different image resolution; and
wherein the image pyramid comprises data representing the representation of the portion of the copy of the image that is at the higher resolution, and data representing the other representation of the portion of the copy of the image.

9. The system of claim 1, wherein in merging the extracted image element and the other image to generate and display the preview, the interactive image compositing application maintains the extracted object and the other image as separately editable images, and does not replace any portion of the data representing the other image with data representing the extracted object.

10. The system of claim 1, wherein the interactive image compositing application is further configured to, prior to said accessing data:
performing a search for images similar to a reference image with respect to at least one visual search criterion;
returning and displaying images meeting the visual search criterion; and
storing one or more images meeting the visual search criterion in the persistent storage.

11. The system of claim 10, wherein said performing a search comprises searching one or more of: a local image database, a remote image database, a collection of images in the public domain, or a commercial image database.

12. The system of claim 10, wherein said performing a search comprises performing the search over a user-specified search domain.

13. The system of claim 10, wherein the at least one visual search criterion comprises a color, a pattern, a color distribution, an image composition, a distribution of image elements, a tonal distribution, or a lighting effect.

14. The system of claim 1, wherein the interactive image compositing application is further configured to:
modify the extracted object in response to user input to modify the extracted object; and
merge the modified extracted object and the other image to generate and display a preview of a composite image in which the modified extracted object, rather than the object of interest, appears to be inserted in the other image.

15. The system of claim 14, wherein to modify the extracted object, the interactive image compositing application is configured to modify data representing the extracted object without modifying data representing the image or the other image.

16. The system of claim 1, wherein the interactive image compositing application is further configured to store the refined version of the composite image in the persistent storage.

17. The system of claim 1, wherein the one or more processors comprise at least one of: a general-purpose central processing unit (CPU) or a graphics processing unit (GPU).

18. A computer-readable storage medium, storing program instructions computer-executable to implement an interactive image compositing application configured to:
access data in persistent storage representing an image in response to selection of the image;
display a copy of the image superimposed over another image;
extract an object of interest from the copy of the image;
merge the extracted object and the other image to generate and display a preview of a composite image in which the extracted object appears to be inserted in the other image; and
subsequent to generating and displaying the preview, render a refined version of the composite image;
wherein to render the refined version of the composite image, the application is configured to operate on a representation of a portion of the copy of the image that comprises the object of interest that is at a higher resolution than another representation of the portion of the copy of the image on which the application operates to generate and display the preview of the composite image.

19. The storage medium of claim 18, wherein to extract the object of interest from the copy of the image, the interactive image compositing application is configured to extract the object of interest from the portion of the copy of the image, wherein the portion of the copy of the image is identified by a rough perimeter drawn around the object of interest using an element of a graphical user interface of the interactive image compositing application.

20. The storage medium of claim 18, wherein to extract the object of interest from the copy of the image, the interactive image compositing application is further configured to apply a fast gradient solver of the interactive image compositing application to the other representation of the portion of the copy of the image to distinguish pixels of the object of interest as pixels of a foreground object and to remove any other pixels within the portion of the copy of the image identified by the rough perimeter as background pixels.

21. The storage medium of claim 20,
wherein the portion of the copy of the image is identified by a rough perimeter drawn around the object of interest using an element of a graphical user interface of the interactive image compositing application; and
wherein said distinguishing pixels of the object of interest is dependent on one or more of: a distance of the pixels from pixels along the rough perimeter, color values of the pixels, intensity values of the pixels, gradient values of the pixels, or one or more pixels marked as being pixels of the object of interest or as background pixels using an element of the graphical user interface of the interactive image compositing application.

22. The storage medium of claim 18,
wherein to generate and display the preview of the composite image, the interactive image compositing application is configured to apply a fast gradient solver of the interactive image compositing application to the other representation of the portion of the copy of the image, wherein the other representation is at a lower resolution than the copy of the image; and
wherein to render the refined version of the composite image, the interactive image compositing application is configured to apply the fast gradient solver of the interactive image compositing application to the representation of the portion of the copy of the image that is at the higher resolution.

23. The storage medium of claim 18, wherein in merging the extracted image element and the other image to generate and display the preview, the interactive image compositing application maintains the extracted object and the other image as separately editable images, and does not replace any portion of the data representing the other image with data representing the extracted object.

24. The storage medium of claim 18, wherein the interactive image compositing application is further configured to, prior to said accessing data:
performing a search for images similar to a reference image with respect to at least one visual search criterion;
returning and displaying images meeting the visual search criterion; and
storing one or more images meeting the visual search criterion in the persistent storage.

25. The storage medium of claim 24, wherein said performing a search comprises performing the search over a user-specified search domain, and wherein the search domain comprises one or more of: a local image database, a remote image database, a collection of images in the public domain, or a commercial image database.

26. The storage medium of claim 24, wherein the at least one visual search criterion comprises a color, a pattern, a color distribution, an image composition, a distribution of image elements, a tonal distribution, or a lighting effect.

27. The storage medium of claim 18, wherein the interactive image compositing application is further configured to:
modify the extracted object in response to user input to modify the extracted object without modifying data representing the image or the other image; and
merge the modified extracted object and the other image to generate and display a preview of a composite image in which the modified extracted object, rather than the object of interest, appears to be inserted in the other image.

28. The storage medium of claim 18, wherein the interactive image compositing application is further configured to store the refined version of the composite image in the persistent storage.

29. A computer-implemented method, comprising:
accessing data in persistent storage representing an image in response to selection of the image;
displaying a copy of the image superimposed over another image;
extracting an object of interest from the copy of the image;
merging the extracted object and the other image to generate and display a preview of a composite image in which the extracted object appears to be inserted in the other image; and
subsequent to generating and displaying the preview, rendering a refined version of the composite image;
wherein said rendering the refined version of the composite image comprises operating on a representation of a portion of the copy of the image that comprises the object of interest that is at a higher resolution than another representation of the portion of the copy of the image that is operated on in said generating and displaying the preview of the composite image.

30. The method of claim 29, wherein said extracting the object of interest from the copy of the image comprises extracting the object of interest from the portion of the copy of the image, wherein the portion of the copy of the image is identified by a rough perimeter drawn around the object of interest using an element of a graphical user interface of an interactive image compositing application.

31. The method of claim 29, wherein said extracting the object of interest from the copy of the image comprises applying a fast gradient solver of an interactive image compositing application to the other representation of the portion of the copy of the image to distinguish pixels of the object of interest as pixels of a foreground object and to remove any other pixels within the portion of the copy of the image identified by the rough perimeter as background pixels.

32. The method of claim 31,
wherein the portion of the copy of the image is identified by a rough perimeter drawn around the object of interest using an element of a graphical user interface of an interactive image compositing application; and
wherein said distinguishing pixels of the object of interest is dependent on one or more of: a distance of the pixels from pixels along the rough perimeter, color values of the pixels, intensity values of the pixels, gradient values of the pixels, or one or more pixels marked as being pixels of the object of interest or as background pixels using an element of the graphical user interface of the interactive compositing image application.

33. The method of claim 29,
wherein said generating and displaying the preview of the composite image comprises applying a fast gradient solver of an interactive image compositing application to the other representation of the portion of the copy of the image, wherein the other representation is at a lower resolution than the copy of the image; and
wherein said rendering the refined version of the composite image comprises applying the fast gradient solver of the interactive image compositing application to the representation of the portion of the copy of the image that is at the higher resolution.

34. The method of claim 29, wherein said merging comprises maintaining the extracted object and the other image as separately editable images, and wherein said merging does not include replacing any portion of the data representing the other image with data representing the extracted object.

35. The method of claim 29, further comprising:
performing a search for images similar to a reference image with respect to at least one visual search criterion;

returning and displaying images meeting the visual search criterion; and storing one or more images meeting the visual search criterion in the persistent storage.

36. The method of claim 35, wherein said performing a search comprises performing the search over a user-specified search domain, and wherein the search domain comprises one or more of: a local image database, a remote image database, a collection of images in the public domain, or a commercial image database.

37. The method of claim 35, wherein the at least one visual search criterion comprises a color, a pattern, a color distribution, an image composition, a distribution of image elements, a tonal distribution, or a lighting effect.

38. The method of claim 29, further comprising:
modifying the extracted object in response to user input to modify the extracted object without modifying data representing the image or the other image; and
merging the modified extracted object and the other image to generate and display a preview of a composite image in which the modified extracted object, rather than the object of interest, appears to be inserted in the other image.

39. The method of claim 29, further comprising storing the refined version of the composite image in the persistent storage.

40. A computer-implemented method, comprising:
executing instructions on a specific apparatus so that binary digital electronic signals representing an image are accessed in persistent storage in response to selection of the image;
executing instructions on said specific apparatus so that binary digital electronic signals representing a copy of the image are displayed superimposed over another image;
executing instructions on said specific apparatus so that binary digital electronic signals representing an object of interest are extracted from the binary digital electronic signals representing the copy of the image;
executing instructions on said specific apparatus so that binary digital electronic signals representing the extracted object of interest are merged with binary digital electronic signals representing the other image to generate and display a preview of a composite image in which the extracted object appears to be inserted in the other image;
subsequent to generating and displaying the preview, executing instructions on said specific apparatus so that binary digital electronic signals representing a refined version of the composite image are rendered; and
storing the binary digital electronic signals representing the refined version of the composite image in a memory location of said specific apparatus for later use;
wherein rendering the refined version of the composite image comprises operating on a representation of a portion of the copy of the image that comprises the object of interest that is at a higher resolution than another representation of the portion of the copy of the image that is operated on in generating and displaying the preview of the composite image.

* * * * *